(12) United States Patent
Tapply et al.

(10) Patent No.: US 9,317,948 B2
(45) Date of Patent: Apr. 19, 2016

(54) METHOD OF AND APPARATUS FOR PROCESSING GRAPHICS

(71) Applicant: ARM Limited, Cambridge (GB)

(72) Inventors: Joe Tapply, Cambridge (GB); Jean Christophe Glas, Trondheim (NO); Jussi Henrik Makela, Trondheim (NO)

(73) Assignee: ARM LIMITED, Cambridge (GB)

( * ) Notice: Subject to any disclaimer, the term of this patent is extended or adjusted under 35 U.S.C. 154(b) by 235 days.

(21) Appl. No.: 13/679,768

(22) Filed: Nov. 16, 2012

(65) Prior Publication Data

US 2014/0139534 A1    May 22, 2014

(51) Int. Cl.
  *G06T 15/10* (2011.01)
  *G06T 11/40* (2006.01)
  *G06T 15/00* (2011.01)

(52) U.S. Cl.
  CPC ............... *G06T 11/40* (2013.01); *G06T 15/005* (2013.01)

(58) Field of Classification Search
  CPC ..................................................... G06T 15/005
  USPC ......................................................... 345/522
  See application file for complete search history.

(56) References Cited

U.S. PATENT DOCUMENTS

| | | |
|---|---|---|
| 5,175,808 A | 12/1992 | Sayre |
| 5,305,430 A | 4/1994 | Glassner |
| 5,392,385 A | 2/1995 | Evangelisti |
| 5,500,928 A | 3/1996 | Cook |
| 5,509,110 A | 4/1996 | Latham |
| 5,522,018 A | 5/1996 | Takeda |
| 5,574,836 A | 11/1996 | Broemmelsiek |
| 5,596,685 A | 1/1997 | Ashton |
| 5,729,672 A | 3/1998 | Ashton |
| 5,794,017 A | 8/1998 | Evans |
| 5,844,571 A | 12/1998 | Narayanaswami |
| 5,886,701 A | 3/1999 | Chauvin |
| 5,949,428 A | 9/1999 | Toelle |
| 6,204,856 B1 | 3/2001 | Wood |

(Continued)

FOREIGN PATENT DOCUMENTS

| | | |
|---|---|---|
| CN | 1421022 | 5/2005 |
| CN | 1641702 | 7/2005 |

(Continued)

OTHER PUBLICATIONS

Visible Surface Algorithms, AgoM05, parts of chapetr 4, 2005.*

(Continued)

*Primary Examiner* — Javid A Amini
(74) *Attorney, Agent, or Firm* — Vierra Magen Marcus LLP

(57) ABSTRACT

A primitive listing and sorting arrangement for a tile-based graphics rendering system in which primitive lists can be prepared for at least two different sets of sub-regions of the render target area. Two or more alternative solutions for listing the primitive for rendering using the sub-regions of at least two of the at least two different sets of sub-regions of the render target area that primitive lists can be prepared for are determined (S62). A cost function is then used to assess the cost of listing the primitive for each determined alternative primitive listing solution (S63) and the primitive listing arrangement to use is then selected based on the cost assessment (S64). Embodiments use an adaptive cost function that can be modified in use based on analysis of the costs for the primitive listing process actually being experienced in use.

22 Claims, 6 Drawing Sheets

(56) References Cited

U.S. PATENT DOCUMENTS

| | | | |
|---|---|---|---|
| 6,288,722 B1 | 9/2001 | Narayanaswami | |
| 6,304,266 B1 | 10/2001 | Li | |
| 6,326,964 B1 | 12/2001 | Snyder | |
| 6,344,852 B1* | 2/2002 | Zhu et al. | 345/418 |
| 6,552,723 B1 | 4/2003 | Duluk | |
| 6,697,063 B1* | 2/2004 | Zhu | 345/421 |
| 6,798,410 B1 | 9/2004 | Redshaw | |
| 6,911,985 B1 | 6/2005 | Fujimoto | |
| 7,002,571 B2 | 2/2006 | Lake | |
| 7,138,998 B2 | 11/2006 | Forest | |
| 7,148,890 B2 | 12/2006 | Rice | |
| 7,167,171 B2 | 1/2007 | Heim | |
| 7,324,115 B2 | 1/2008 | Fraser | |
| 7,418,156 B1 | 8/2008 | Candela | |
| 8,681,168 B2* | 3/2014 | Nystad et al. | 345/581 |
| 2002/0015064 A1 | 2/2002 | Robotham | |
| 2003/0142100 A1* | 7/2003 | Lavelle et al. | 345/537 |
| 2003/0151608 A1 | 8/2003 | Chung | |
| 2003/0227457 A1 | 12/2003 | Pharr | |
| 2004/0066384 A1 | 4/2004 | Ohba | |
| 2004/0095343 A1 | 5/2004 | Forest | |
| 2004/0227767 A1 | 11/2004 | Baroncelli | |
| 2006/0072831 A1 | 4/2006 | Pallister | |
| 2006/0129908 A1 | 6/2006 | Markel | |
| 2006/0170693 A1 | 8/2006 | Bethune | |
| 2007/0101013 A1 | 5/2007 | Howson | |
| 2007/0146378 A1 | 6/2007 | Sorgard | |
| 2007/0165035 A1 | 7/2007 | Duluk | |
| 2008/0012878 A1 | 1/2008 | Nystad | |
| 2008/0150950 A1* | 6/2008 | Sorgard et al. | 345/522 |
| 2008/0170066 A1* | 7/2008 | Falchetto | 345/419 |
| 2009/0303245 A1* | 12/2009 | Soupikov et al. | 345/582 |
| 2010/0097382 A1 | 4/2010 | Nystad | |
| 2010/0177105 A1* | 7/2010 | Nystad et al. | 345/522 |
| 2011/0221743 A1 | 9/2011 | Keall et al. | |

FOREIGN PATENT DOCUMENTS

| | | |
|---|---|---|
| CN | 1774727 | 5/2006 |
| CN | 101067869 | 11/2007 |
| GB | 2251770 | 7/1992 |
| GB | 2281682 | 3/1995 |
| GB | 2298111 | 8/1996 |
| GB | 2343603 | 5/2000 |
| GB | 2433014 A | 6/2007 |
| GB | 2444628 | 6/2008 |
| GB | 2444863 | 6/2008 |
| GB | 2433014 | 7/2008 |
| GB | 2444628 A | 11/2008 |
| GB | 24488196 A | 8/2012 |
| JP | 2002-526842 | 8/2002 |
| JP | 2003-529859 | 10/2003 |
| JP | 2004-348702 | 12/2004 |
| JP | 2006-521612 | 9/2006 |
| JP | 2008-165760 | 7/2008 |
| WO | WO90/06561 | 6/1990 |
| WO | WO95/28685 | 10/1995 |
| WO | WO97/06512 | 2/1997 |
| WO | WO98/29838 | 7/1998 |
| WO | WO00/11605 | 3/2000 |
| WO | WO00/19377 | 4/2000 |
| WO | WO00/28483 | 5/2000 |
| WO | WO01/75803 | 10/2001 |
| WO | WO01/95257 | 12/2001 |
| WO | WO2004/066059 | 8/2004 |
| WO | WO2004/086309 | 10/2004 |
| WO | WO2004/093012 | 10/2004 |
| WO | WO2005/020582 | 3/2005 |
| WO | WO2005/116930 | 12/2005 |

OTHER PUBLICATIONS

Hidden Surface Removal, 2009.*
Hierarchical Polygon Tiling with Coverage Masks, Ned Greene, 1996.*
A Sorting Classification of Parallel Rendering Steven Molnar, Michael Cox, David Ellsworth, Henry Fuchs University of North Carolina at Chapel Hill and Princeton University 1994 IEEE.*
Hsiao, et al., "A Hierarchical Primitive Lists Structure for Tile-based Rendering," 2009 International Conference on Computational Science and Engineering, pp. 408-413, Aug. 2009.
Xie, et al., "Adaptive Hierarchical Visibility in a Tiled Architecture," 1999 Proceedings of the ACM SIGGRAPH/Eurographics, pp. 75-84, 1999.
Crisu, 3D Graphics Tile-Based Systolic Scan-Conversion, downloaded Feb. 2010, pp. 517-521.
Crisu, Efficient Hardware for Antialiasing Coverage Mask Generation, Jun. 2004, pp. 1-8, (Proceedings of the Computer Graphics International).
Crisu, Efficient Hardware for Tile-Based Rasterization, Nov. 2004.
M. Cox, "Architectural Implications of Hardware-Accelerated Bucket Rendering on the PC" Proceedings of the ACM SIGGRAPH/Eurographics Workshop on Graphics, 1997, pp. 25-34.
M. Olano et al., "Triangle Scan Conversion using 2D Homogeneous Coordinates" Proceedings of the ACM SIGGRAPH/Eurographcs Workshop on Graphics, 1997, pp. 89-95.
Maurice Ribble, gdc 2008, Next-Gen Tile-Based GPUs, Feb. 18-22, 2008; San Francisco.
Greene, Hierarchical Polygon Tiling with Coverage Masks, Jun. 20, 1995.
Hyun, Hardware-Driven Visibility Culling paper, Document No. 20073114, pp. 1-7, 2007 (http://juipter.kaist.ac.kr/~sungeui/SGA07/).
J. Foley, Computer Graphics, Second edition, 1990, pp. 668-672.
J. Pineda, "A Parallel Algorithm for Polygon Rasterization," Computer Graphics vol. 22, No. 4, Aug. 1998, pp. 17-20.
Jason Cross Publication, Intel Lifts the Larrabee Veil a Little, Tile Rendering is Back-CPUs, Boards & Components by Extreme Tech. mht. Aug. 4, 2008.
Zone Rendering—Whitepaper, Document No. 298587-001, May 2002, pp. 1-15.
Antochi, I. et al., Efficient tile-aware bounding-box overlap test for tile-based rendering dated Nov. 18, 2004, Proceedings. 2004 International Symposium on System-on-Chip, 2004.
English translation of Second Office Action dated Jan. 4, 2012, Chinese Patent Application No. CN200610130945.0.
English translation of Third Office Action dated May 14, 2012, Chinese Patent Application No. CN200610130945.0.
English translation of Chinese Office Action dated Dec. 12, 2012, Chinese Patent Application No. CN200610130945.0.
First Office Action dated Sep. 23, 2011, Chinese Patent Application No. CN200710306692.2.
English translation of First Office Action dated May 2, 2013, Chinese Patent Application No. CN201010002994.2.
Search Report and Examination Report mailed Apr. 14, 2007, Great Britain Patent Application No. GB0624311.7.
Search Report and Examination Report mailed Apr. 16, 2009, Great Britain Patent Application No. GB0900700.6.
Search Report and Examination Report mailed May 11, 2010, Great Britain Patent Application No. GB1000710.2.
English translation of Office Action dated Aug. 28, 2012, Japanese Patent Application No. JP2007-314022.
English translation of Office Action dated Mar. 21, 2013, Japanese Patent Application No. JP2007-314022.
English translation of Office Action dated Mar. 26, 2013, Japanese Patent Application No. JP2007-314022.
Office Action dated Nov. 18, 2011, U.S. Appl. No. 11/987,265.
Office Action dated Aug. 7, 2013, U.S. Appl. No. 11/987,265.
Office Action dated May 19, 2009, U.S. Appl. No. 11/633,647.
Office Action dated Jan. 26, 2010, U.S. Appl. No. 11/633,647.
Office Action dated Jan. 22, 2010, U.S. Appl. No. 11/633,647.
Office Action dated May 24, 2011, U.S. Appl. No. 11/633,647.
Office Action dated Mar. 27, 2013, U.S. Appl. No. 12/686,187.
English translation of Abstract of Chinese Patent No. CN1421022.
English translation of Abstract of Chinese Patent No. CN1774727.

(56) References Cited

OTHER PUBLICATIONS

English translation of Abstract of Japanese Patent No. JP2002-526842.
English translation of Abstract of Japanese Patent No. JP2003-529859.
English translation of Abstract of Japanese Patent No. JP2004-348702.
English translation of Abstract of Japanese Patent No. JP2006-521612.
English translation of Abstract of Japanese Patent No. JP2008-165760.
U.S. Appl. No. 13/909,556, filed Jun. 4, 2013, "Method of and Apparatus for Processing Graphics,".
Office Action dated May 9, 2014 in Great Britain Application No. GB1320136.3, 5 pages.

\* cited by examiner

METHOD OF AND APPARATUS FOR PROCESSING GRAPHICS

BACKGROUND

The technology described herein relates to a method of and apparatus for processing graphics, and in particular to such a method and apparatus for use in a tile-based graphics processing system.

As is known in the art, graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

Many graphics processing systems use so-called "tile-based" rendering. In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those primitives that are actually present in a given rendering tile so as to, e.g., avoid unnecessarily rendering primitives that are not actually present in a tile. In order to facilitate this, it is known to prepare for each rendering tile a list of the primitives to be rendered for that rendering tile (e.g. that will appear in the tile). Such a "primitive-list" (which can also be referred to as a "tile list") identifies (e.g. by reference to a primitive indicator) the primitives to be rendered for the tile in question.

The process of preparing primitive lists for each tile to be rendered basically involves determining the primitives that should be rendered for a given rendering tile. This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile list for each tile that it falls within.) In effect, each tile can be considered to have a bin (the primitive-list) into which any primitive that is found to fall within (i.e. intersect) the tile is placed (and, indeed, the process of sorting the primitives on a tile-by-tile basis in this manner is commonly referred to as "binning").

As known in the art, the process of determining the primitives that should be listed (rendered) for any given rendering tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

FIG. 1 illustrates the exact binning process. As shown in FIG. 1, a render target in the form of a frame 1 to be displayed is divided into sixteen regularly sized tiles 2 for rendering purposes. It is then determined for each primitive in the frame, which tile or tiles the primitive actually appears (falls) within. The primitive is added to the primitive-list for each tile that it is found to fall within. Thus, taking the example shown in FIG. 1, the primitive 3 is added to the primitive-list for tile 4, the primitive 5 is included in the primitive-list for tiles 6 and 7, the primitive 8 is included in the primitive lists for tiles 9, 10, 11 and 12, and the primitive 13 is included in the primitive-list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare primitive-lists with a lower precision than is achieved with exact binning. This can be useful to, e.g., simplify the preparation of the primitive-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

Once lists of primitives to be rendered (primitive-lists) have been prepared for each rendering tile in this way, the primitive-lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the render target where they are not present.

However, one drawback with the need to prepare and store primitive-lists identifying the primitives to be rendered for each tile is that depending on the distribution of the primitives for a given, e.g., frame to be rendered, the primitive-lists for different tiles to be used for the frame can be very different sizes, as can the primitive lists for tiles for different frames. This means that, e.g., a given render output or tile may have significantly different memory requirements for storing its primitive list(s) as compared to other tiles or render outputs.

The Applicants have accordingly already proposed in their UK Patent No. 2433014 an improved tile-based rendering system, which prepares primitive lists both for single rendering tiles, and primitive lists for render target areas comprising more than one tile (i.e. primitive lists that encompass more than one rendering tile (and thereby, in effect, a larger area) of the output to be generated). In other words, as well as preparing lists of primitives that are exclusive to single rendering tiles only, primitive-lists that can and will be used for plural rendering tiles in common can be and are prepared.

As discussed in the Applicant's earlier patent, preparing different render target "area" primitive lists has a number of advantages, such as allowing the amount of memory that is used for the primitive lists to be varied, and facilitating better control over and knowledge of the memory usage requirements for the primitive listing process.

In the Applicant's earlier patent, the primitives are basically sorted into the primitive lists for different sized areas of the render target so as to limit the number of different primitive lists a given primitive will be listed in. This helps to control the amount of memory that will be needed for the primitive lists.

However, the Applicants have now recognised that some additions and variations to the scheme described in their earlier patent can, at least in certain circumstances, be advantageous.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figure 1:
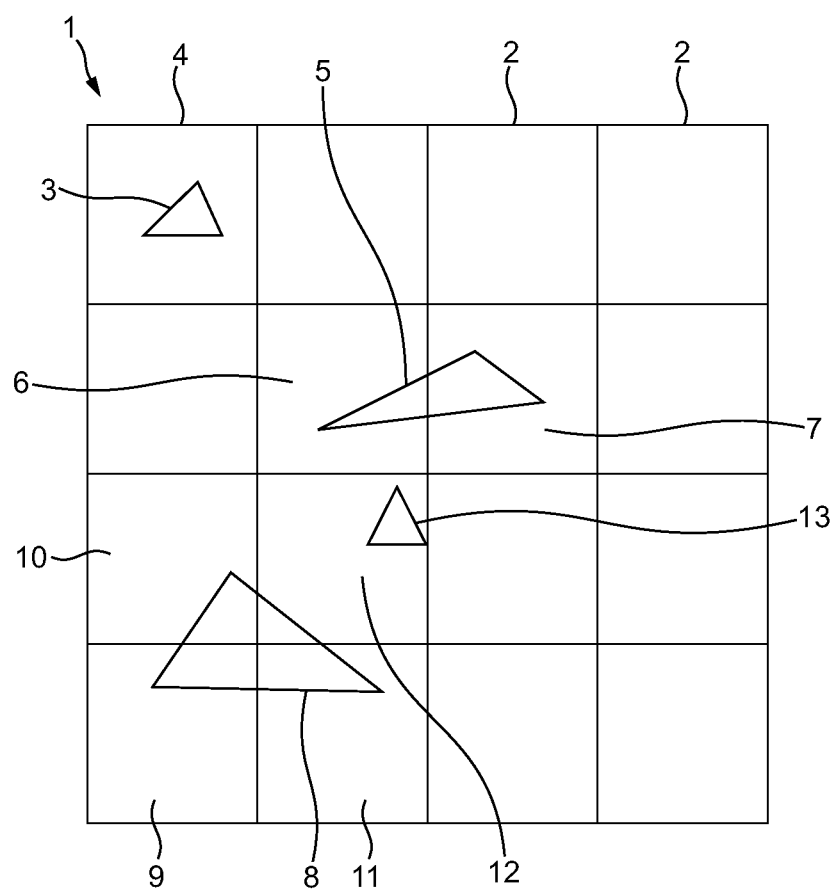
FIG. 1 shows schematically a tile-based graphics-processing arrangement.

A first embodiment of the technology described herein comprises a method of sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for at least two different sets of sub-regions of the render target area, at least one of the two different sets of sub-regions of the render target area comprising sub-regions of the render target area that are bigger than a single rendering tile, the method comprising:
for a primitive to be rendered:
determining sub-regions of at least two of the at least two different sets of sub-regions of the render target area that the primitive could need to be listed for in order to render the primitive;
using a cost function to assess the cost of listing the primitive in the primitive lists for the render target area sub-regions that it has been determined that the primitive could need to be listed for; and
selecting which of the render target area sub-regions that it has been determined that the primitive could need to be listed for in order to render the primitive to list the primitive for on the basis of the cost function assessment, and including the primitive in the primitive lists of those sub-regions.

A second embodiment of the technology described herein comprises an apparatus for sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for at least two different sets of sub-regions of the render target area, at least one of the two different sets of sub-regions of the render target area comprising sub-regions of the render target area that are bigger than a single rendering tile, the apparatus comprising processing circuitry configured to:
determine for a primitive to be rendered, sub-regions of at least two of the at least two different sets of sub-regions of the render target area that the primitive could need to be listed for in order to render the primitive;
use a cost function to assess the cost of listing the primitive in the primitive lists for the render target area sub-regions that it has been determined that the primitive could need to be listed for; and
select which of the render target area sub-regions that it has been determined that the primitive could need to be listed for in order to render the primitive to list the primitive for on the basis of the cost function assessment, and include the primitive in the primitive lists of those sub-regions.

A third embodiment of the technology described herein comprises a method of sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for different-sized regions of the render target, the method comprising:
for a primitive to be rendered:
determining regions of the different-sized regions of the render target that the primitive could need to be listed for in order to render the primitive;
using a cost function to assess the cost of listing the primitive in the primitive lists for the render target regions that it has been determined that the primitive could need to be listed for; and
selecting which of the render target regions that it has been determined that the primitive could need to be listed for in order to render the primitive to list the primitive for on the basis of the cost function assessment, and including the primitive in the primitive lists of those regions.

A fourth embodiment of the technology described herein comprises an apparatus for sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for different-sized regions of the render target, the apparatus comprising processing circuitry configured to:
determine, for a primitive to be rendered, regions of the different-sized regions of the render target that the primitive could need to be listed for in order to render the primitive;
use a cost function to assess the cost of listing the primitive in the primitive lists for the render target regions that it has been determined that the primitive could need to be listed for; and
select which of the render target regions that it has been determined that the primitive could need to be listed for in order to render the primitive to list the primitive for on the basis of the cost function assessment, and include the primitive in the primitive lists of those regions.

The technology described herein relates to a tile-based graphics processing system that uses primitive lists for plural sets of sub-regions of the render target (i.e. that uses primitive lists for different-sized regions of the render target (i.e. of the intended output of the rendering process, such as a frame to be displayed)), like in the Applicants' earlier UK Patent. However, in the technology described herein, the primitive lists that a primitive is listed in are selected based on an assessment of the cost of including the primitive in different possible primitive lists. As will be discussed further below, this can have a number of advantages.

The Applicants have recognised that in a system where multiple different render target area primitive lists are supported, there can be a number of factors that can be affected by the choice of render target area sub-region at which to list a given primitive. For example, although it may be more effective from a memory capacity point of view to store a given primitive at a higher level (i.e. in a primitive list that encompasses a larger region (area) of the render target), as the primitive may then only be written to and stored in a single primitive list, on the other hand, the primitive may need to be read from the list more times in use, as it will need to be read for each rendering tile that the primitive list relates to. Including a primitive in the primitive lists for single rendering tiles will reduce the number of potentially unnecessary reads of the primitive from the primitive lists, but require the primitive to be written to and stored in more primitive lists.

Figure 6A:
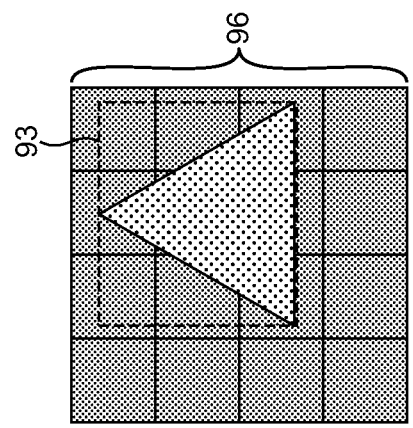
FIG. 6 shows schematically the effect of listing a primitive for different sets of render target sub-regions.
Figure 6B:
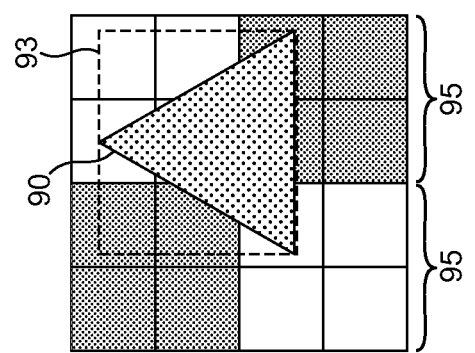
Figure 6C:
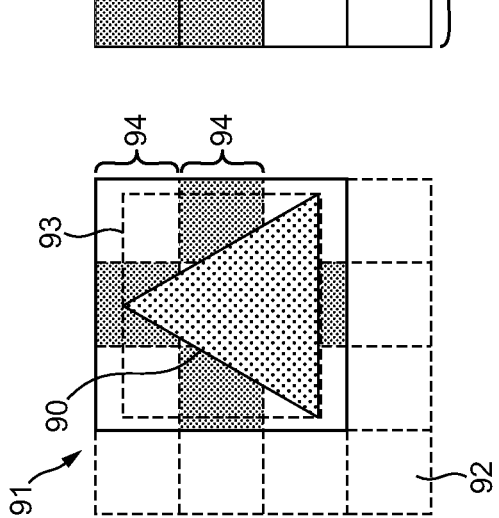

FIG. 6 illustrates this and shows a render target 91 that is divided into 4×4 rendering tiles 92 for rendering purposes and overlain by three sets of different sized render target area sub-regions (shown in FIGS. 6a, 6b and 6c, respectively) for which primitive lists can be prepared. As will be discussed below, these sets of render target sub-regions for which primitive lists can be prepared are arranged to provide, in effect, three layers of progressively larger render target sub-regions overlaying the render target 91 in a hierarchical fashion.

FIG. 6 also shows a primitive 90 that is to be output to the render target 91, and that has a bounding box 93 derived for it. The bounding box 93 for the primitive 90 is used to determine which render target sub-regions the primitive 90 should be listed in.

The first layer (set) of render target sub-regions for which primitive lists can be prepared in this example comprises, as shown in FIG. 6a, sub-regions 94 that each cover (and match) one rendering tile (i.e. that are 1×1 rendering tiles in size). If the primitive 90 is listed in this layer (in this set of render target sub-regions), it will be listed in the primitive lists for nine render target sub-regions, thus requiring nine primitive command writes and nine primitive command reads when rendering the primitive.

FIG. 6b shows a second layer (set) of render target sub-regions in which each render target sub-region 95 for which a primitive list is prepared encompasses 2×2 rendering tiles. Listing the primitive 90 at this layer in the hierarchy will require the primitive to be listed for each one of the four 2×2 rendering tile render target sub-regions, thus requiring four command writes and sixteen command reads (as the four 2×2 render target sub-regions cover sixteen rendering tiles in total).

FIG. 6c shows the highest layer in the hierarchy, in which there is a single render target sub-region 96 that encompasses the whole of the render target area, i.e. there is one sub-region, encompassing the 4×4 rendering tiles of the render target area. Listing the primitive at this layer in the hierarchy will require one command write and sixteen command reads (as the 4×4 render target sub-region covers sixteen rendering tiles in total).

It can be seen from this that depending upon which set (i.e. layer) of render target sub-regions the primitive 90 is listed at, the number of read and write operations required for rendering the primitive will vary. Thus, there will be differences in terms of cost for listing (binning) a primitive, depending upon the render target sub-regions the primitive is listed for. The technology described herein takes account of this, by using a cost function when determining how to list a primitive for rendering. The Applicants have found that this can lead to significant savings in terms of, e.g., memory bandwidth and power consumption for the primitive listing (binning) and rendering process.

As discussed above, the technology described herein is applicable to tile-based graphics processing systems, in which the rendering target (such as, e.g., a frame to be displayed) is divided into plural rendering tiles for rendering purposes (is processed on a tile-by-tile basis). The tiles that the render target (output) is divided into for rendering purposes in the technology described herein can be any suitable and desired such tiles. The size and shape of the rendering tiles will, as is known in the art, normally be dictated by the tile configuration that the graphics processor is configured to use and handle.

The rendering tiles are in an embodiment all the same size and shape (i.e. regularly-sized and shaped tiles are in an embodiment used), as is known in the art, although this is not essential. The tiles are in an embodiment square or rectangular. The size and number of tiles can be selected as desired. In one arrangement, each tile is 16×16 or 32×32 sampling positions in size (with the render target then being divided into however many such tiles as are required for the render output size and shape that is being used).

The sets of render target sub-regions for which primitive lists can be prepared can be arranged and configured as desired. At least one of the sets of render target sub-regions should comprise sub-regions that comprise more than one rendering tile (that are bigger than a single rendering tile).

In one embodiment, one of the sets of sub-regions comprises sub-regions that correspond to the individual rendering tiles (that are one (1×1) rendering tile in size) (i.e. such that each rendering tile will have a primitive list that is exclusive to that rendering tile prepared for it).

In this case, the sets of sub-regions will comprise one set of sub-regions in which each sub-region of the set corresponds to a respective single rendering tile, and one or more (and in an embodiment more than one) sets of sub-regions in which each sub-region of the set corresponds to (encompasses) more than one rendering tile.

It is not necessary for one of the sets of sub-regions to comprise sub-regions that correspond to the individual rendering tiles (i.e. that are one (1×1) rendering tile in size). Thus, in another embodiment, all of the sets of render target sub-regions comprise sub-regions that comprise more than one rendering tile (that are bigger than a single rendering tile). In this case, the sets of sub-regions will comprise two or more sets of sub-regions in which each sub-region of the set corresponds to (encompasses) more than one rendering tile.

The sub-regions in each different set of sub-regions should encompass different areas of the render target, i.e. each different set of sub-regions should have different sized sub-regions to the sub-regions in the other sets of render target sub-regions for which primitive lists can be prepared.

In an embodiment, the render target sub-regions, and in an embodiment each render target sub-region, comprises a group of contiguous rendering tiles (or part tiles). In an embodiment the render target sub-region or each render target sub-region forms a regularly shaped area of the render target. The render target sub-regions are in an embodiment rectangular (including squares). However, again this is not essential, and more irregular sub-region shapes, such as, e.g., an "L"-shaped or a triangular shaped sub-region(s) could be used, if desired. Again such irregular shapes may be useful for listing more unusual or irregularly, shaped and/or sized primitives.

Each sub-region of more than one rendering tile may and in one embodiment does, comprise an integer number of rendering tiles. For non-square render targets, each sub-region of more than one rendering tile in an embodiment comprises an integer number of rendering tiles, but there are in an embodiment different numbers of sub-regions in the x and y directions (e.g. a widescreen image might be mapped to 32×16 sub-regions at the lowest level, 16×8 sub-regions at the level above, and so on).

It would also, e.g., be possible to prepare primitive lists for rendering target sub-regions comprising portions of rendering tiles, such as, for example, comprising one and a half tiles, or three and three-quarter tiles, etc. Such rendering target sub-regions comprising fractions of rendering tiles may be desirable for particular, e.g., unusual or irregular, primitive shapes, and/or sizes, as they may allow such primitives to be more efficiently listed in the primitive-lists. They may also be useful for render targets that have unusual and/or non-square shapes, as in that case it may be preferable to divide the render target into sub-regions that are not integer numbers of rendering tiles.

Each set of sub-regions in an embodiment comprises sufficient sub-regions to cover (and covers) the entire render target, i.e. encompass all the individual rendering tiles that the render target is divided into. Thus a given set of render target sub-regions will contain plural sub-regions, where appropriate, with primitive lists able to be prepared for each of the plural render target sub-regions in the set as appropriate (i.e. there will be plural primitive lists, each corresponding to a given sub-region of the set of render target sub-regions).

Each render target sub-region in a given set of render target sub-regions could be different (e.g. in terms of their size and/or shape), but in an embodiment the render target sub-regions in a given set of render target sub-regions all have the same size, and in an embodiment also the same shape, as each other (i.e. in an embodiment cover the same number of rendering tiles).

Each sub-region of a given set of the render target sub-regions in an embodiment comprises a different set of rendering tiles to the other render target sub-regions of the set in question. Similarly, each and every render target sub-region in a given set of render target sub-regions in an embodiment covers a different part (area) of the render target.

In an embodiment, the sets of render target sub-regions for which primitive lists can be prepared are arranged such that the render target is effectively overlaid by plural layers of sets of sub-regions (with each layer being one set of sub-regions). Each layer should, and in an embodiment does, have different sized sub-regions for which primitive lists can be prepared to the other layers. The layers (sets of sub-regions) in an embodiment have progressively decreasing levels of resolution (i.e. their sub-regions encompass increasing numbers of rendering tiles). These arrangements can allow, for example, the render target to be effectively covered by plural different resolution layers of sub-regions, with each such "layer" being made up of a set of plural sub-regions in which each sub-region contains the same number of rendering tiles, and the sub-regions in different "layers" containing different numbers of rendering tiles.

Such arrangements effectively allow primitive lists to be prepared for progressively decreasing levels of resolution (i.e. division into sub-areas) of the render target. This allows the resolution at which the primitive lists are prepared to be varied and controlled.

In an embodiment, the sets of render target sub-regions for which primitive lists can be prepared are arranged in a hierarchical fashion, i.e. such that the number of sub-regions in each set progressively changes as one moves through the sets of sub-regions. The sets of sub-regions are in an embodiment arranged such that they effectively form a pyramidal structure as one progresses up the sets.

The render target area and/or number of rendering tiles included in the sub-regions in an embodiment progressively increases as one moves up the sets of sub-regions from lowest set (which may, e.g., be, and in one embodiment is, a base, single rendering tile sub-region set). In one embodiment, the sets of sub-regions are arranged such that the sub-regions in each successive set have 4 times the area (and/or as many rendering tiles in them) as the immediately preceding set of sub-regions, i.e. such that if the lowest (base) set of sub-regions is of single rendering tile sub-regions, there is then a set of four (2×2) rendering tiles sub-regions, then a set of 16 (4×4) rendering tile sub-regions, and so on, in an embodiment up to a set containing a single sub-region that encompasses the entire render target. In an embodiment there is, in effect, three or more such layers.

Similarly, in an embodiment, the sets of sub-regions layering hierarchy is in an embodiment arranged such that primitive lists can, in effect, be prepared for the entire render target, for the render target area divided into four sub-regions, for the render target area divided into 16 sub-regions, for the render target area divided into 64 sub-regions, and so on, down to its division into the individual rendering tiles.

(Varying the sub-regions by a factor of 4 on each successive level is a particularly convenient arrangement for increasing the size as the levels change. However, it is not essential and other arrangements could be used if desired.)

The determination of which sub-regions of the render target area (of the sets of sub-regions for which primitive lists can be prepared) a primitive could need to be listed for in order to render the primitive can be carried out in any appropriate and desired manner. Essentially this process will, as will be appreciated by those skilled in the art, need to identify which sub-regions of the render target the primitive (potentially) falls within. Any technique already known and used for sorting and binning primitives into tile-lists and render target regions or areas, such as exact binning, or bounding box binning, or anything in between, can be used for this process. In an embodiment bounding box binning is used.

In an embodiment, an initial determination of the render target sub-regions that a primitive to be rendered could fall within is made, e.g., and in an embodiment, based on a determined location of the primitive (in an embodiment of a bounding box for the primitive) in the render target.

Thus, in an embodiment, a location for the primitive in the render target is determined and compared to the sub-regions that the render target is divided into to determine which sub-regions of the sets of render target sub-regions the primitive could or should be listed in (e.g. appears (falls) within).

In an embodiment the respective sub-regions of a given set of sub-regions that the primitive would needed to be listed for in order to render the primitive if listing it solely in that set of sub-regions are determined (i.e. the sub-regions of a given set of sub-regions that the primitive potentially falls within are determined). This is in an embodiment then repeated for one or more other sets of sub-regions. Thus, in an embodiment, the sub-regions of at least two of the sets of sub-regions that the primitive potentially falls within are determined (e.g. based on a bounding box for the primitive).

The primitive (e.g. using its bounding box) could be tested against each and every set of render target sub-regions that the system supports (and can prepare primitive lists for), and should, in any event, be tested against at least two sets of sub-regions (against the sub-regions of at least two sets of sub-regions). However, where the system supports, e.g., more than two sets of sub-regions, a primitive could, if desired, only be tested against some, but not all, of the possible sets of sub-regions.

Once the sub-regions that the primitive could need to be listed for have been determined, then, as discussed above, a cost function is then used to assess the cost of listing the primitive for those render target sub-regions.

The cost function that is used to assess the cost of listing the primitive in the primitive lists for the determined render target sub-regions can be selected and configured as desired. The cost function is in an embodiment configured to take account of, and in an embodiment to try to optimise, the memory bandwidth and/or the performance (e.g. and in an embodiment any latencies) between the graphics processor and the memory where the primitive lists are stored. The memory bandwidth for the primitive listing operations may be optimised by, for example, trying to increase (maximise) the cache hit rate for the primitive list operations. Thus, the cost function in an embodiment takes account of (expected and/or measured) cache miss rates for the system.

The cost function in an embodiment takes account of (is based on) the relative cost of writing a primitive in a primitive list to reading a primitive from a primitive list. This is an important factor to consider, as the Applicants have recognised, as discussed above, that the render target sub-region "level" (size) at which a primitive is listed can affect in particular, the number of times a primitive will be written to and read from a primitive list. Thus, depending, e.g., upon the relative cost of writing and reading primitives to and from primitive lists in the graphics processing system in question, it may be that listing the primitives at a higher or lower primitive list level (i.e. for larger or smaller render target sub-regions) will be preferable. Also, the relative costs of reading and writing primitives from and to primitive lists can vary from system to system (can be system dependent)

Thus, in an embodiment, the cost function takes account of (is based on) a cost for writing the primitive to the primitive list or lists in question. It in an embodiment also or instead (and in an embodiment also) takes account of (is based on) a cost of reading the primitive from the primitive list or lists in question.

As discussed above, the Applicants have recognised that if one wishes to reduce the overall memory bandwidth used in the primitive list operations, for example, then there is a balance to be struck between the number of lists a primitive is written in to, and the size of the render target sub-regions it is listed for (as this will determine the number of times the primitive will need to be read, potentially unnecessarily). If a primitive is listed at a lower level (for smaller render target sub-regions), it will have to be written into a larger number of primitive lists, but if it is written at a higher level (for larger render target sub-regions), it will be re-read more times as the list for the sub-region is reused for each rendering tile it covers. Using a cost function that considers both read and write costs helps to optimise this balance.

The write cost for writing the primitive to the primitive lists is in an embodiment based on a predefined cost or costs for writing a primitive to a primitive list, multiplied by the number of primitive lists that the primitive would be written to.

The read cost for reading the primitive is in an embodiment based on a predefined cost or costs for reading a primitive from a primitive list, multiplied by the number of rendering tiles that the primitive will have to be read for, given the primitive list or lists it would be listed in (which number of rendering tiles will be the number of rendering tiles covered by the primitive list or lists that the primitive would be listed in).

In an embodiment, the reading cost takes account of both the cost of reading the primitive list itself, and the cost of reading the vertices for the primitive. Thus the base read cost is in an embodiment based on the primitive list read cost plus the vertex read cost per rendering tile.

The base costs to write or read the primitive once may be based, e.g., on any suitable parameters that could affect the cost of these operations, such as, and in an embodiment, cache size and performance, memory latencies, etc. for the system in question. Such costs may, e.g., be estimated, or they may, e.g., also or instead be determined in advance and/or in use, for example by testing the system (e.g. using a statistical analysis of suitable test data).

The cost function may also take account of other factors that could influence the primitive read and write costs, if desired. For example, if the reading operation reads groups of rendering tiles at a time (e.g. through the use of coverage masks), this can be taken into account by modifying the relative read costs, if desired.

The read and write costs in an embodiment depend on (are varied based on) the size (area) of the render target sub-regions (i.e. the number of rendering tiles that the render target sub-regions cover). The Applicants have recognised that the read and write costs will depend on the size of the render target sub-region, as the size of the render target sub-region (i.e. how many rendering tiles it covers), will, e.g., have a bearing on the cacheability of the, e.g., commands and vertices, that will be read for the primitive when it is rendered. For example, where a primitive list applies to a single rendering tile sub-region only, it will be read just once, and therefore there would be no benefit in caching the read data. However, render target sub-regions that cover more than one rendering tile will be read more than once (i.e. for each rendering tile that they cover), and therefore it would be advantageous to cache this data. The use of such caching should make the read and write costs relatively lower for larger render target sub-regions, and so the cost function in an embodiment takes account of this.

Thus, in an embodiment the "base" read and/or write cost (or costs) is different for different size sub-regions.

In an embodiment, the cost function uses a predefined "overall" cost for each given render target sub-region (primitive list) and then sums these costs for each primitive list being considered (e.g. that the primitive would be written to). The overall cost for listing a primitive in the primitive list of a given render target sub-region is in an embodiment based on, and in an embodiment the sum of, the read and write costs for the primitive list in question, as discussed above. In an embodiment the "overall" cost is different for different size sub-regions.

The base, predefined read and write, and/or overall, cost (or costs) for listing a primitive in a given primitive list (for a given render target sub-region) may be, and in an embodiment is, stored for use by the graphics processing system when required. In an embodiment there is a look-up table of the cost(s) to be used for the respective primitive lists.

The predefined "base" cost values (cost function co-efficient values), e.g., that are stored in the cost function look-up table, may be determined as desired. In an embodiment, a set of such values is determined (generated) by statistical analysis of a number of benchmark render outputs (e.g. frames) to be rendered. These predetermined values are in an embodiment then used as the initial values at least that are stored, e.g., in the look-up table, for use by the graphics processing system.

It would be possible simply to continue to use these initial generated cost function values at all times, and in one embodiment this is done. In this case, there will accordingly be a set of stored predetermined cost function values (co-efficients) that are used.

However, in an embodiment, the stored, initial values of the cost function co-efficients can be, and in an embodiment are, updated (modified) in use. This has the advantage, e.g., that the cost function values being used can be adapted to the specific processor implementation in which it is being used (e.g. the hardware itself, the size of the caches, the actual latencies being encountered, etc.), rather than being fixed to the "test" system that was used to derive the initial cost function values. It also has the advantage that the cost function can in use be adapted to the current system conditions, such as run time problems, other loads on the system, the specific content being rendered, etc., that, e.g., may not be so easily assessable when carrying out the initial testing, and/or that may vary dynamically in use.

Using an adaptive cost function operation thus allows, e.g., the cost function operation to be adapted to provide a more optimum solution for the actual content on the actual system that it is being used for (rather than it, e.g., being fixed to assumptions that may have been made when deriving the initial cost function data). The system can also re-optimise itself in real-time, e.g., as the rendering content and/or memory sub-system load changes in use. Using an adaptive cost function operation should also allow the operation to perform better on a wider range of hardware systems and for a wider range of load conditions, and improve the efficiency of the primitive listing (binning) even further.

These arrangements of the technology described herein could also, e.g., be used to dynamically optimise power consumption in systems where the read and write power costs are not the same (e.g. reads may hit caches whereas writes usually have to go out to main memory).

Thus, in an embodiment, an adaptive cost function is used.

The updating of the stored cost function values can be carried out in any desired and suitable manner. In an embodiment the cost of, e.g., reading and/or writing, the primitives from and to the primitive lists actually being encountered in use is assessed, and then the cost function (the stored cost function values) updated based on this, if necessary. A threshold test, for example, could be used to determine if the "actual" cost value has deviated from the stored value sufficiently to warrant updating the stored value.

Thus, there is in an embodiment a feedback loop from the rendering processing to the cost function operation settings, that is used to adapt the cost function operation in use. This can then, in effect, enhance the accuracy of the cost function by measuring the "real" cost of the primitive listing (binning) in use.

The actual read and write costs, etc., being encountered in use can be determined and assessed as desired. For example, where the graphics processing system includes performance counters, these counters could be, and in an embodiment are, used to assess the actual costs being experienced, e.g., by sampling the performance counters, based on events relating to the cost function measurement system. For example, the performance counters of the graphics tiling unit could be used to measure the miss rates in the tiling unit's pointer cache and write buffer to assess the actual write cost being experienced in use. Similarly, the primitive list reader's performance counters could be used to determine the miss rates and latencies experienced when reading the primitives from the primitive lists.

Thus, in an embodiment, performance counters are used to assess (measure) the read and write costs (performance) being experienced by the system in use, e.g., and in an embodiment during runtime, and this information is then used to update the cost function operation, in an embodiment by updating the cost values used in the cost function, appropriately (and if necessary).

The measured in use performance, as indicated, e.g., by the performance counters, can be processed and used to adjust the cost function operation as desired. For example, it can be processed in software, or hardware, or a combination of the two.

For example, the driver for the graphics processor could read the performance counters and update the cost function values, for example, accordingly. Alternatively or additionally, the graphics processing system could be configured to use hardware sampling and reading of the performance counters and cost function updating. This would potentially allow more detailed and "live" performance information to be used. It would also be possible, e.g., to use a management microcontroller in the graphics processing unit for this, if desired.

The performance of the system can be measured, e.g., during normal processing, i.e. when the system is rendering real data (primitives) for output to a render target, and in an embodiment this is done.

In an embodiment, the system can also or instead, and in an embodiment also, generate test primitives that are processed specifically for the purpose of assessing the primitive list processing performance and the cost function operation. By using test primitives to assess the performance of the system, a more accurate and potentially less intrusive adaptive cost function arrangement can be achieved.

Thus, in an embodiment, dummy primitives for testing purposes can be included in (injected into) a primitive stream to be rendered. The dummy primitives may, e.g., be randomly injected invisible primitives, or multiple render target set of sub-region level guesses for a single "real" primitive. In the latter case, the test process in an embodiment determines which set of sub-regions hierarchy level should have been chosen for the primitive and passes one copy of the primitive for rendering. Any invisible dummy (test) primitives are in an embodiment removed from the stream of primitives sent for rendering (once the necessary cost function information has been determined). In an embodiment the write-cost and read-cost information is collected just for the dummy (test) primitives.

The dummy (test) primitives are in an embodiment compressed and handled in the same manner as "real" primitives. They could be used to send a lot of sideband information to the primitive list reader, such as the write addresses for statistics for specific dummy primitives, and/or updated cost function co-efficient values. The primitive list reader could, e.g., be configured to conditionally write the better choice directly back to the tiling unit's cost function co-efficient table, thus closing the feedback loop in hardware.

The adapting of the cost function in view of the measured system performance can take any suitable and desired form. In an embodiment, the individual cost function co-efficient values, such as, and in an embodiment, the write, read, and/or overall cost values are modified based on the measured performance. For example, and in an embodiment, the cost function co-efficient values stored in the cost function look-up table could be, and in an embodiment are, updated based on the measured performance.

Other modifications to the cost function operation could also or instead be done, if desired. For example, in an embodiment, one or more render target sets of sub-regions hierarchy levels can be, and in an embodiment are, enabled or disabled (i.e. permitted to be used or not) based on the measured performance. This will allow the system to adaptively select which render target sets of sub-regions (hierarchy levels) are in use at any one time. Either a single set of sub-regions (hierarchy level), or plural sets of sub-regions (hierarchy levels) could, e.g., be disabled, as desired. Such a mechanism could be achieved by setting, e.g., the cost function co-efficient values for a set of sub-regions (hierarchy level) to be disabled to such high values as to ensure that the cost function operation will never select that level.

It would also be possible to configure the cost function operation to also or instead take account of variations in the writing and/or reading (or other costs) for the primitive listing process that it is known will be encountered, e.g. over time as the listing process proceeds. For example, the Applicants have recognised that for some primitive listing process encoding schemes the writing and/or reading costs for listing primitives may vary as the listing process proceeds. For example, when using a delta (difference)-based compression scheme when listing the primitives in the primitive lists, where listing the initial primitives for a given list (bin) will need more bytes to encode than writing later primitives to that list (bin) (as the delta-compression scheme will mean that less bytes will be needed to write later primitives in the list), then the cost of writing primitives to the primitive list will (temporarily) be higher when the list is first created, but then decrease once the delta-compression scheme can be used.

In an embodiment the cost function operation is accordingly configured to take account of such known variations in the costs that will be incurred for the primitive listing process as the listing process proceeds, such as, and in an embodiment, known variations in the writing and/or reading costs that will occur as the primitive listing process proceeds. In an embodiment, this is achieved by setting the cost function coefficient values for the sets of sub-regions (hierarchy levels) to appropriate values to account for these costs.

Thus, in an embodiment, the (e.g., and in an embodiment, write) cost for a primitive for a set of sub-regions is set to an initial value to be used before the list (bin) for the set of sub-regions in question has been created and stored, but is then varied (and in an embodiment decreased) as the primitive listing process proceeds (over time). This is in an embodiment done for each set of sub-regions for which a primitive list can be prepared.

Similarly, in an embodiment, the cost coefficient values for a set of sub-regions (hierarchy level) (and in an embodiment for each set of sub-regions (for each hierarchy level)) for which a primitive list can be prepared are set to initial values to be used before a list for the set of sub-regions in question has been created, and then varied, and in an embodiment decreased, from that initial value to another, different (e.g. lower) value or values as the primitive listing process proceeds (over time).

Thus, in an embodiment, the (e.g., and in an embodiment, write) cost for a primitive for a set of sub-regions is set to an initial value to be used before the list (bin) for the set of sub-regions in question has been created and stored, but is then varied (and in an embodiment decreased) once the list contains a particular, selected number of primitives (e.g. at least one primitive). This is in an embodiment done for each set of sub-regions for which a primitive list can be prepared.

Similarly, in an embodiment, the cost coefficient values for a set of sub-regions (hierarchy level) (and in an embodiment for each set of sub-regions (for each hierarchy level)) for which a primitive list can be prepared are set to initial values to be used before a list for the set of sub-regions in question has been created, and then varied, and in an embodiment decreased, from that initial value to another, different (e.g. lower) value or values once the primitive list for the set of sub-regions in question contains a particular, selected number of primitives.

In an embodiment, the, e.g. write, cost for a given set of sub-regions is similarly temporarily increased when re-writing a primitive list that isn't already "open" (cached for the primitive listing process) when using a delta-based compression scheme, to take account of the fact that the cost of re-writing a list that isn't cached (already in use) may be higher than writing to a list that has already been cached, e.g. because if the primitive list isn't cached, it may be necessary to re-read the previous data item in order to calculate the new delta (difference) to be used, or the system may in this event revert to writing uncompressed data to start with.

As well as using the cost function assessment to select which primitive lists a primitive should be included in, other criteria could be applied to the primitive listing process, if desired.

For example, the memory capacity requirements for the primitive lists could be taken into account. For example, there could be a constraint on the number of primitive lists (such as a maximum number of primitive lists) that a primitive is allowed to be included in. Thus, in an embodiment, a primitive (and in an embodiment each primitive) is not listed in more than a selected, in an embodiment predetermined, (threshold) number of primitive lists. This may facilitate, e.g., more precise control and knowledge of the memory usage requirement for the primitive (tile) lists. This could be achieved, e.g., by testing a primitive at each successive level (layer) of the sets of render target sub-regions, to determine how many different primitive lists the primitive would need to be included in at the level (set of sub-regions) in question. In an embodiment, the maximum number of primitive lists that a primitive can be included in, where used, is four.

Each primitive should be listed in one primitive list only in respect of each rendering tile for which it is to be rendered.

In an embodiment, each primitive is listed for one set of render target sub-regions (i.e. at one level of the sets of sub-regions resolution (of the hierarchy)) only, i.e. the primitive is listed for the same set of (level (size) of) render target sub-regions for all the render target sub-regions where it is to be listed.

The cost function assessment can be used in any desired and suitable manner to select and determine which render target sub-regions' primitive lists a primitive should be included in. In an embodiment, the process uses the cost function to determine the cost of listing the primitive for two or more possible primitive listing (binning) solutions for the primitive in question, and then selects the primitive listing (binning) solution having the lowest determined cost. Thus the primitive listing (binning) process in an embodiment determines the cost for binning (listing) the primitive for plural different primitive binning (listing) solutions, and determines the optimal listing (binning) solution based on this (i.e., in practice, and in an embodiment, the listing (binning) solution that has the minimum cost as determined by the cost function, subject to any other constraints that there may be on the primitive listing process).

Where the cost function is based on the cost of writing primitive list commands to memory and then reading them back when shading the primitive, this process will in effect find the "cheapest" way of listing the primitive based on a model of the cost of writing primitive list commands to memory and then reading them back when shading the primitive.

The cost for each primitive listing (binning) solution being considered is in an embodiment determined as discussed above, by using stored predefined cost values that are then, e.g., multiplied appropriately based on the number of primitive lists that the primitive would be listed in for the solution in question and/or the number of rendering tiles covered by the primitive lists that the primitive would be listed in for the solution in question.

It can be seen that in these arrangements, the technology described herein, in effect, determines two or more alternative binning (primitive listing) arrangements (solutions) for rendering a primitive, determines the cost of those binning arrangements using a cost function, and then selects one of the binning arrangements on the basis of the cost assessment.

Thus, a fifth embodiment of the technology described herein comprises a method of sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for at least two different sets of sub-regions of the render target area, at least one of the two different sets of sub-regions of the render target area comprising sub-regions of the render target area that are bigger than a single rendering tile, the method comprising:

for a primitive to be rendered:
determining two or more alternative solutions for listing the primitive for rendering using the sub-regions of at least two of the at least two different sets of sub-regions of the render target area that primitive lists can be prepared for;
for each determined alternative primitive listing solution using a cost function to assess the cost of listing the primitive in the primitive lists of the render target area sub-regions that it has been determined that the primitive would need to be listed for to render the primitive;
selecting one of the determined alternative primitive listing solutions on the basis of the cost function assessment; and
including the primitive in the primitive lists of the render target area sub-regions that it has been determined that the primitive would need to be listed for the selected primitive listing solution.

A sixth embodiment of the technology described herein comprises an apparatus for sorting graphics primitives for rendering into lists representing different areas of a render target to be generated in a tile-based graphics processing system in which a render target is divided into plural rendering tiles for rendering purposes and in which system primitive lists indicating primitives to be processed can be prepared for at least two different sets of sub-regions of the render target area, at least one of the two different sets of sub-regions of the render target area comprising sub-regions of the render target area that are bigger than a single rendering tile, the apparatus comprising processing circuitry configured to:

determine, for a primitive to be rendered, two or more alternative solutions for listing the primitive for rendering using the sub-regions of at least two of the at least two different sets of sub-regions of the render target area that primitive lists can be prepared for;
use a cost function to assess, for each determined alternative primitive listing solution, the cost of listing the primitive in the primitive lists of the render target area sub-regions that it has been determined that the primitive would need to be listed for to render the primitive;
select one of the determined alternative primitive listing solutions on the basis of the cost function assessment; and
include a primitive in the primitive lists of the render target area sub-regions that it has been determined that the primitive would need to be listed for the selected primitive listing solution.

As will be appreciated by those skilled in the art, these embodiments of the technology described herein can include one or more or all of the features of the technology described herein, as appropriate. Thus, for example, the cost function in an embodiment considers the respective write and read costs for the binning arrangements being determined, and/or in an embodiment uses an adaptive cost function, etc.

As discussed above, in an embodiment, the system is constrained so that a primitive will only be listed (binned) for a single set of render target sub-regions (i.e. at a single render target sub-region hierarchy level). In this case, the primitive listing (binning) solutions that are considered accordingly in an embodiment each correspond to listing the primitive for a respective different set of render target sub-regions (at a respective different render target sub-region hierarchy level).

Thus, in an embodiment of these embodiments of the technology described herein, the cost function assessment process determines the cost of listing the primitive entirely (and exclusively) at each of two or more of, and in an embodiment at each of, the available render target sub-region hierarchy levels, and then selects the render target sub-region set (level) having the lowest determined cost. Thus the primitive listing (binning) process in an embodiment determines the cost for binning (listing) the primitive entirely (exclusively) at one of the plural render target sub-region hierarchy sets (levels), repeats this for one or more other ones of the plural render target sub-region hierarchy sets (levels), and then determines the optimal binning solution based on this.

Where each primitive is constrained to being listed at a single set of render target sub-regions (at a single render target sub-region hierarchy level) only, then in an embodiment an overall cost per primitive list (bin) for each set of render target sub-regions hierarchy level is stored, and then multiplied by the number of lists (bins) the primitive would be included in for that set (at that level), to determine a total cost for listing (binning) the primitive for that set (at that level). This is then repeated for each binning sub-region set (hierarchy level) being considered and the primitive then listed for the set (at the level) determined to have the lowest cost (subject to any other constraints, such as a limit on the number of different primitive lists that a primitive is allowed to be included in).

Thus, in an embodiment, the primitive listing (binning) process for a primitive comprises determining a bounding box for the primitive, calculating for some or all (and at least two) of the sets of render target sub-regions the number of sub-regions needed to contain the bounding box, using the determined number of sub-regions in a cost function to estimate the cost for listing (binning) the primitive for that set of sub-regions, choosing the set of sub-regions having the lowest estimated cost as the set of sub-regions for which to list the primitive, and writing the primitive to the appropriate render target sub-region primitive lists for that set of render target sub-regions.

While it would be possible in these arrangements to test each and every possible binning solution, e.g. set of sub-regions, for which a primitive could be listed, the Applicants have recognised that this may not always be practicable, e.g. as it may be too costly in terms of area/power or time. Thus, in an embodiment some (and at least two), but not all, of the possible binning solutions (e.g., and in an embodiment, sets of sub-regions) are tested in this manner.

It will be appreciated from the above that a given primitive will typically only be included in the primitive lists for selected (a selected number of the) render target sub-regions that cover the render target area where the primitive lies, i.e. a primitive will be listed in (at least) one, but not all, of the separate primitive lists for all the render target sub-regions that cover the render target area where the primitive lies.

Although the technology described herein has been described above with particular reference to the processing of a given primitive, as will be appreciated by those skilled in the art, these processes should be performed for each primitive in the render output (e.g. frame to be displayed) to allow a complete set of primitive lists for the render output to be prepared. Thus, the system in an embodiment sorts plural primitives, and in an embodiment all the primitives for the render output, in the manner of the technology described herein, e.g., and in an embodiment, one after another, in turn.

While it is not essential that a primitive list is prepared for each and every sub-region that a given render target is or can be divided into, in an embodiment, a primitive list is prepared for each render target sub-region that primitive lists can be prepared for. (However, it should be noted that in some cases in this arrangement the primitive lists may be and can be empty (i.e. contain no primitives), depending, e.g., on how the primitives are distributed in the render target, and in which primitive lists it is decided to store the primitives in.)

The individual primitive lists and the primitives in them can be arranged in any desired and suitable fashion and include any desired and suitable data. The lists are in an embodiment arranged and contain data in the manner that is already used for such lists in the art. Thus they in an embodiment include, for example, an identifier for, and indices or pointers to the vertices for, and/or commands for, etc., each primitive in the list. (Thus references herein to writing, listing, binning, reading, etc., a primitive in a primitive list are intended, unless the context requires otherwise, to refer to the writing, etc., of the appropriate commands, data, etc., for the primitive (that represent and/or are associated with the primitive) in a primitive list.)

The primitives are in an embodiment listed (ordered) in each list in the desired rendering order (first to last), as this allows the primitives to be read from the lists on a first-in, first-out basis. As is known in the art, the primitives will usually be generated in the order in which they are to be rendered. In such a case the primitives can simply be, and in an embodiment are, listed in each list in the order that they are generated.

Once all the primitives have been sorted and primitive lists have been prepared for the render target sub-regions as discussed above, the rendering tiles can then be processed and rendered, in turn, as is known in the art, using the primitive lists to determine which primitives need to be processed for each tile.

This rendering process may be and in an embodiment is carried out in a similar manner to known tile-based rendering systems. Thus, in an embodiment, each rendering tile is processed and rendered separately, i.e. the separate, individual tiles are rendered one-by-one. This rendering can be carried out in any desired manner, for example, by rendering the individual tiles in succession or in a parallel fashion. Once all the tiles have been rendered, they can then be recombined, e.g., in a frame buffer, e.g. for display, as is known in the art.

Thus the technology described herein in an embodiment comprises, once the primitive lists have been prepared, rendering the primitives to generate the render output, on a tile-by-tile basis, using the primitive lists to determine which primitives to render for each tile to be rendered (to determine which primitives should be rendered for which tiles).

As will be appreciated by those skilled in the art, as each rendering tile is processed and rendered, it will be necessary to check the primitive lists of all the render target sub-regions that include (cover) the rendering tile in question in order to determine the primitives that must be processed and rendered for the tile.

This primitive list checking and the identifying of primitives to be rendered for a given rendering tile can be carried out as desired. In an embodiment, the primitive lists are provided to a primitive selection unit that selects the next primitive to be rendered from the primitive lists and then provides that primitive to a rendering unit (e.g. pipeline) for rendering.

The primitive selection unit can take any appropriate form. In an embodiment it comprises a tile read unit.

In an embodiment, the different primitive lists, e.g. different level (resolution) lists that cover a given rendering tile are provided to the primitive selection unit in parallel (i.e. simultaneously), with the primitive selection unit then selecting the next primitive to process from one of the lists.

The set of primitive lists that primitives are to be selected from for a given rendering tile (i.e. the set of primitive lists that the primitive selection unit should read to identify primitives for rendering for a given tile) can be indicated (e.g. to the primitive selection unit) in any desired fashion, for example by sending this data as appropriate to the graphics processor (e.g. primitive selection unit). In an embodiment, this information is sent when a new tile is to be rendered, e.g. as part of or associated with a "new tile" command (the command that tells the rendering unit to start rendering a new tile). Thus, each rendering tile in an embodiment has associated with it in some way, the set of primitive lists to be used for the tile. Other arrangements would, of course, be possible.

The information indicating which primitive lists are to be used for a given rendering tile can be provided in any suitable and desired form. In an embodiment, a set of pointers or indices to the relevant primitive lists is provided. In another embodiment, changes to the set of pointers or indices to the primitive lists are provided, to allow the system to identify and change the primitive lists that need to be changed when a new tile is to be rendered. It would also be possible to, e.g., prepare a predetermined set of relationships between the primitive lists to use and the x-y positions of the tiles, which relationships could then be used to determine the primitive lists to use for a tile on the basis of the tile's x, y coordinates. For example, the x, y position of a rendering tile could be used to index into a look-up table specifying the primitive lists to be used for each tile position. Other arrangements would, of course, be possible.

The next primitive to be rendered can be chosen (e.g. by the primitive selection unit) from the primitive lists that are to be used for the tile in any desired and suitable manner.

In an embodiment, the primitive generating and sorting process is able to index or add an index to the primitives, in an embodiment as they are included in the primitive lists, and this index is then used, e.g., by the primitive selection unit, to select the primitive to be processed next. The indexing is in an embodiment done by numbering the primitives consecutively, in an embodiment as they are included in the primitive lists. In an embodiment, the index allocated to a primitive is only changed (e.g. (incremented) when the set of sub-regions (the hierarchy level) at which the primitive is being listed changes (i.e. differs to the set of sub-regions (the hierarchy level) for the preceding primitive).

Such indexing of the primitives as they are listed (binned) assists with the rendering process for a tile, as it will, e.g., facilitate rendering the primitives in the correct order. In particular, the (sorting) index given to each primitive can be used to select the next correct (desired) primitive for rendering, thereby allowing, e.g., the desired primitive order to be reconstructed when the primitives are to be rendered and helping to ensure that the primitives can be and are taken from the different primitive lists for rendering in the desired (correct) order (typically the order in which they are first generated).

In an embodiment of the technology described herein, a primitive list or lists can be and in an embodiment is or are cached by or in the graphics processor, in an embodiment by the primitive selection unit, i.e. the primitive lists can be and in an embodiment are stored in a local, more rapidly accessible memory of the graphics processor. Thus, the apparatus and method of the technology described herein in an embodiment include caching a primitive list or lists. Such caching can reduce bandwidth usage in respect of the primitive lists.

Although the technology described herein has been described above with reference to the storing of primitive lists for sub-regions of the render target, it would also or instead be possible to store other graphics data on a similar basis. For example, there are other forms of graphics data, such as graphics, e.g. rendering, settings, such as scissoring parameters and primitive type parameters (e.g. whether a primitive is a point, line, triangle or quad) and tile commands (e.g. a final tile command), that may be specified or able to be specified on a per rendering tile or per render target sub-region basis.

The Applicants have recognised that it could equally be advantageous to be able to store (selectively) these types of data on a render target sub-region basis, in a similar manner to the primitive lists discussed above.

For example, if a particular parameter or command is to be used for each and every rendering tile, it may be preferable to store it in a single primitive (or other) list that is to be used for the whole render target in common. On the other hand, for a command or data that is needed for one or a few rendering tiles only, it may be preferable to store it only in respect of render target sub-region(s) that encompass those rendering tiles, e.g. at a lower level in the hierarchy that encompasses the relevant rendering tiles only.

Thus, the system of the technology described herein can in an embodiment also store data and commands other than primitives in the manner described above for preparing the primitive lists (for example, and in an embodiment, in separate "lists" for sub-regions of the render target).

In these arrangements, the graphics data (e.g. commands and settings) could, for example, be stored in separate, e.g., "commands", lists for the render target sub-regions. However, in an embodiment, this graphics data is included in the primitive lists for the sub-regions, i.e. such that a and in an embodiment each primitive list can and will include a list of primitives together with other graphics data, such as commands, settings and/or parameters interspersed within the list of primitives.

In an embodiment, this other graphics data is indexed in a similar manner to the primitives, as this will again allow the data to be used in the correct order. Again, a separate index could be used for this data, but in an embodiment it is indexed within the indexing of the primitives, i.e. such that, for example, the system will (where, for example, a command is to be executed after the first three primitives have been rendered) render primitives 1, 2, 3, then execute command 4, then render primitives 5, 6, . . . , and so on.

It should be noted here that although references herein to "primitives" are primarily intended to refer to graphics primitives in the form of "simple" polygons such as triangles, grids, lines or points, etc., as is known in the art (and, in an embodiment, do refer to graphics primitives in the form of "simple" polygons such as triangles, quads, lines or points), the technology described herein is also applicable to larger graphics objects or primitives, such as graphics components or primitives that are intended to represent larger objects in the scene and/or groups of smaller polygons (such as a group of contiguous triangles). For example, it may be desired to process and sort a group of plural individual polygons as a single graphical object or primitive. Such larger, "complex" primitives ("meta-primitives") can equally be listed for render target sub-regions in the manner of the technology described herein. Thus references herein to "primitives", etc., should, unless the context otherwise requires, be interpreted accordingly.

The performance measures that are used to adaptively tune the cost function operation of the technology described herein can also be used to actively tune the memory sub-system in systems that provide, e.g., priority arbitration and quality of service support, if desired. For example, a cache with several masters and slaves could be configured to prioritise one or more masters and/or slaves based on the performance statistics. For example, priority could be given to reads and writes to the render target sub-region set (level) that has the most primitives.

The technology described herein is applicable to any form or configuration of graphics processor and renderer, such as renderers having a "pipelined" arrangement (in which case the renderer will be in the form of a rendering pipeline).

The technology described herein accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and processing circuitry and/or programmable hardware elements and processing circuitry that can be programmed to operate in the desired manner.

The various functional elements may be separate to each other or may share circuitry (e.g. be performed by the same processor and/or processing circuitry) as desired.

In one embodiment the apparatus of the technology described herein comprises dedicated (non-programmable) processing circuitry configured to operate in the manner described. In another embodiment, it comprises programmable processing circuitry that is programmed to operate in the manner described.

In an embodiment the functions of the technology described herein are carried out on a single graphics processing platform that generates and outputs the graphics data that is written as the render output (e.g. to the frame buffer for a display device).

In some embodiments, the data processing system, graphics processing system, data processors, graphics processors, processing circuitry, apparatus, etc., of the technology described herein may be in communication with memory and/or one or more memory devices that store the data described herein, such as the primitive data, the primitive lists, the cost-function and cost-function parameters (factors), etc., and/or that store software for performing the processes described herein. The data processing system, graphics processing system, data processors, graphics processors, processing circuitry, apparatus, etc., may also be in communication with a display for displaying images based on the primitive lists, etc.

It should also be noted here that, as will be appreciated by those skilled in the art, the various functions, etc., of the technology described herein may be duplicated and/or carried out in parallel on a given processor. There may be, for example, plural tiling units and/or primitive selection units operating in parallel.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to FIGS. 2, 3, 4 and 5.

Figure 2:
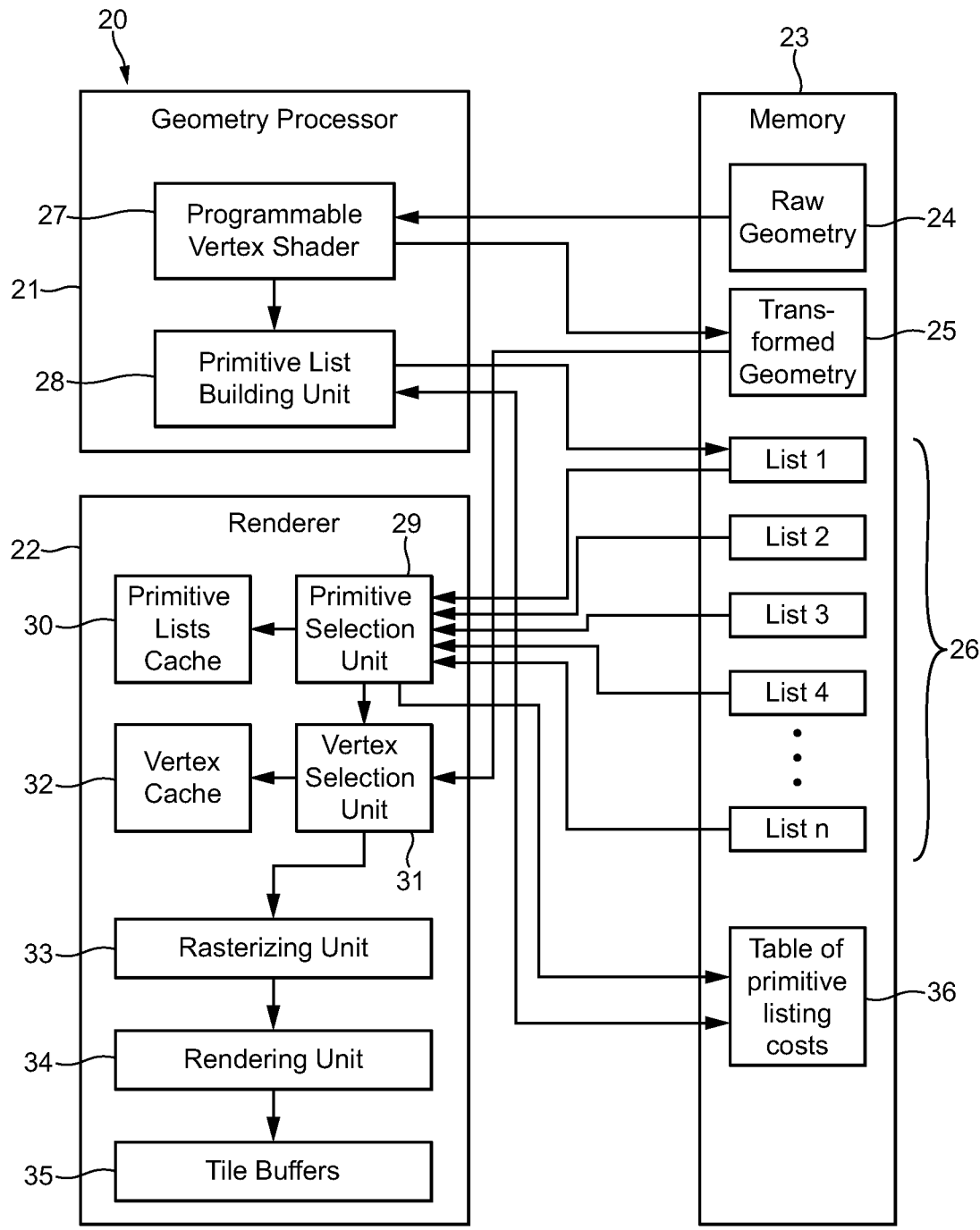
FIG. 2 shows schematically an arrangement of a graphics processor that can operate in accordance with the technology described herein.

FIG. 2 shows schematically a graphics processor 20 that may be operated in accordance with the technology described herein. The graphics processor 20 includes a geometry processor 21, and a renderer 22, both of which can access a memory 23. The memory 23 may be, as is known in the art, "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20, as is known in the art), a set of transformed geometry data 25 (which is the result of various transformation and processing operations carried out on the raw geometry 24, again, as is known in the art), and a set of primitive lists 26. The primitive lists 26 contain data, commands, etc., for the respective primitives, as is known in the art, and are prepared in accordance with the technology described herein. This process will be described in more detail below.

The transformed geometry data 25 comprises, for example, transformed vertices (vertex data), etc., as is known in the art.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the render output (e.g. frame to be displayed). The programmable vertex shader 27 and the processes it carries out can take any suitable form and be any suitable and desired such processes known in the art.

The primitive list building unit 28 carries out the process of the technology described herein of allocating the primitives to the primitive lists which are then used by the renderer 22 to identify the primitives that should be rendered for each tile that is to be rendered to generate the render output (which in this embodiment is a frame to be rendered for display). To do this, the primitive list building unit 28 takes as its input the transformed and processed vertex (geometry) data 25 from the programmable vertex shader 27 (i.e. the positions of the primitives in the frame), builds primitive lists using that data, and stores those lists as the primitive lists 26 in the memory 23. This process will be described in more detail below.

The renderer 22 includes a primitive selection unit 29, a primitive list cache 30, a vertex selection unit 31, a vertex data cache 32, a rasterising unit 33, a rendering unit 34, and tile buffers 35.

The rasterising unit 33, rendering unit 34, and tile buffers 35 operate, in this embodiment, in the usual manner for such units in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to an output render target, such as a frame buffer for a display.

The primitive selection unit 29 of the renderer 22 determines which primitive is to be rendered next. It does this by considering the primitive lists 26 stored in the memory 23, and selecting from one of those lists the next primitive to be rendered. This selection process again will be described in more detail below.

The primitive selection unit 29 can also place one or more primitive lists in the primitive list cache 30.

The primitive selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

As discussed above, the rasterising unit 33 then rasterises the primitive to fragments, and provides those fragments to the rendering unit 34 for rendering. The rendering unit 34 performs a number of rendering processes, such as texture mapping, blending, shading, etc. on the fragments, to generate rendered fragment data for the fragments representing the primitive, and stores the rendered fragment data in the tile buffers 35 for providing to an output render target, such as a frame buffer for a display.

The operation of the primitive list building unit 28 and the preparation of the primitive lists 26 will now be described in more detail with reference to FIGS. 3, 4 and 5.

As discussed above, the technology described herein is applicable to a rendering system in which the render target (e.g. a frame to be rendered) is rendered as plural individual rendering tiles. Furthermore, as well as the render target being divided into tiles for rendering purposes, the render target area is also, in effect, divided into plural sets of sub-regions for which separate (different) primitive lists (i.e. list of primitives to be rendered) can be and are prepared.

Figure 4:
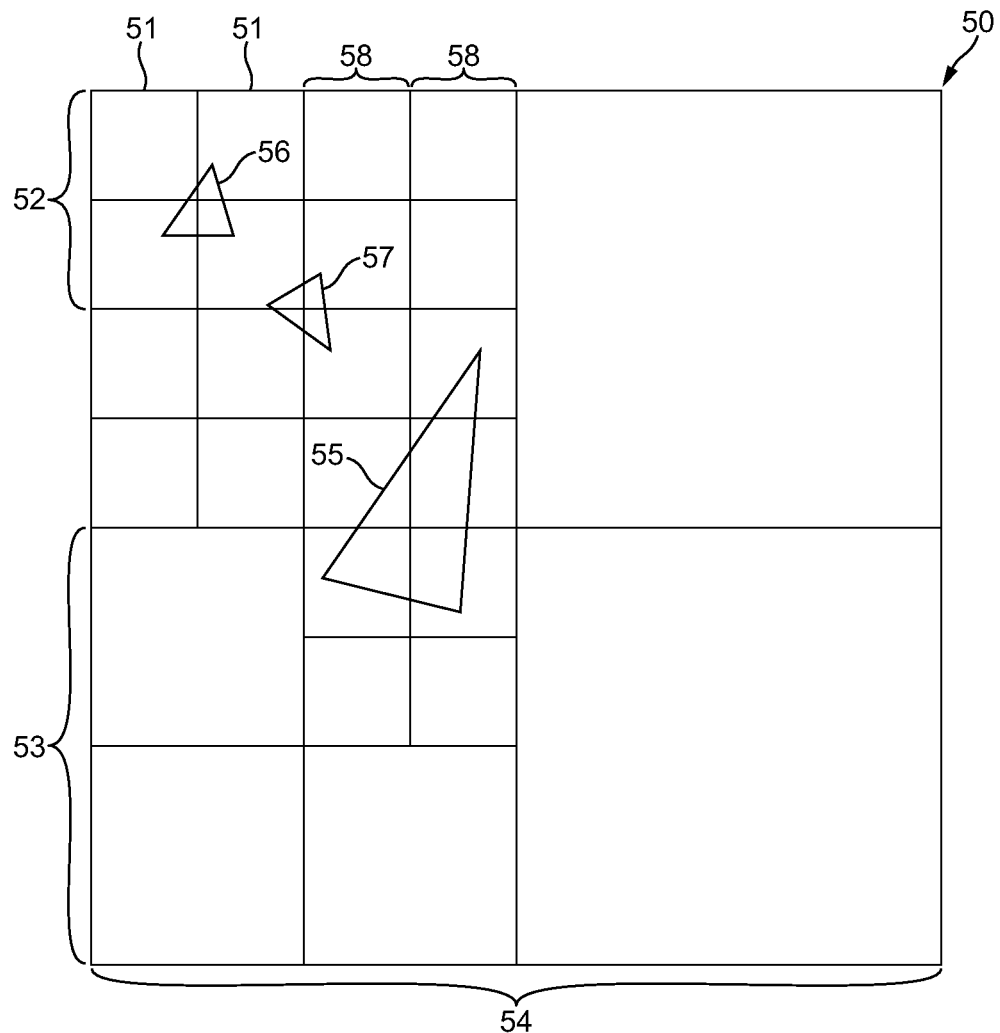
FIG. 4 shows schematically a set of primitives in a frame to be rendered.
Figure 5:
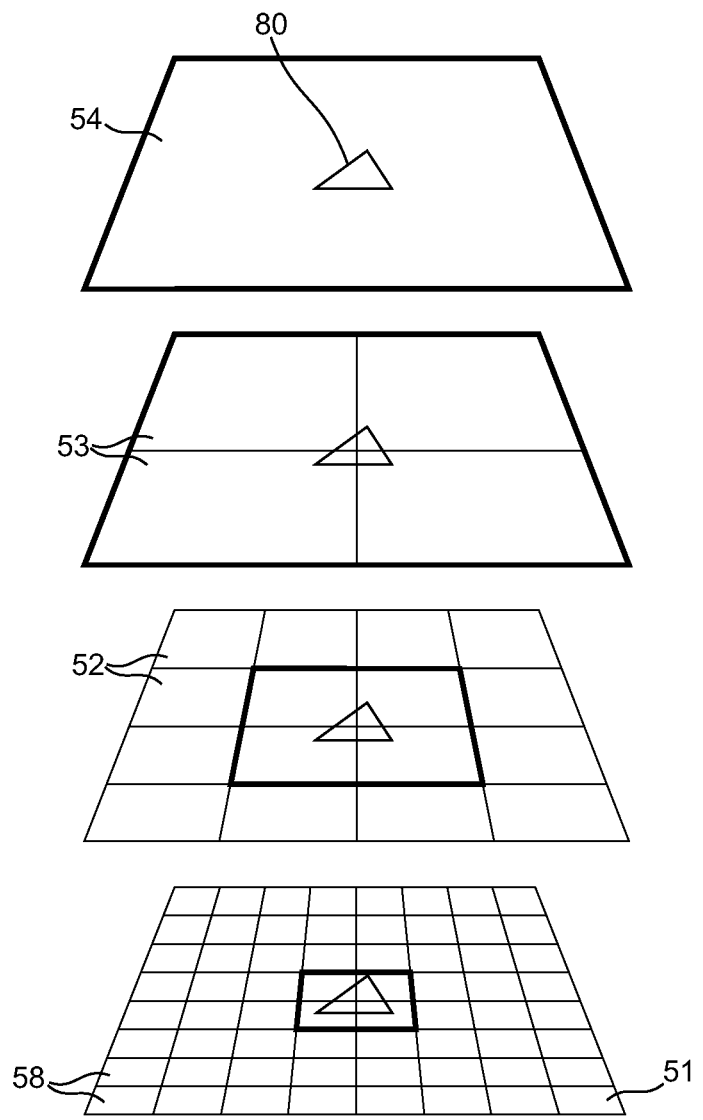
FIG. 5 shows schematically an embodiment of a layered arrangement of sets of sub-regions of a render target.

FIGS. 4 and 5 illustrate an embodiment of an arrangement of the sets of render target sub-regions for which primitive lists can be prepared that can be used with the present embodiment.

FIG. 4 shows a render target 50 (e.g. a frame to be displayed) that is divided into plural individual rendering tiles 51 for rendering purposes. (It should be noted here that FIG. 4 does not show all the individual rendering tiles 51 that the render target 50 is divided into, but only a few of those rendering tiles. This is for clarity purposes. However, the entire render target 50 is divided into equal rendering tiles 51 in practice.)

In this embodiment, a primitive list can be prepared for each rendering tile individually (i.e. there is a primitive list that is exclusive to each rendering tile 51). Thus, the system has a first set of render target area sub-regions 58 for which primitive lists can be prepared, in which each sub-region 58 in the set corresponds to a respective single rendering tile 51.

As well as the individual rendering tile 51 render target sub-regions 58, the render target 50 is also overlaid by sets of render target sub-regions whose respective sub-regions contain differing groups of plural rendering tiles 51. These sets of plural rendering tile sub-regions are in effect laid over the render target 50 to provide layers having different (area) divisions of the overall render target area.

Thus, as shown in FIG. 4, there is a set ("layer") of sixteen render target sub-regions 52 each comprising 2×2 rendering tiles 51. There is then another, lower resolution set (layer) comprising four sub-regions 53 each of 4×4 rendering tiles. Finally, there is a set of sub-regions comprising one sub-region 54 which encompasses the entire render target area (and thus encompasses the 8×8 rendering tiles of the render target).

As can be seen from FIG. 4, the effect of this arrangement is that the render target 50 is overlaid with a progressively increasing hierarchy of render target area sub-divisions. This is shown schematically in FIG. 5. Thus there is a top level layer comprising a set of one sub-region 54 of 8×8 rendering tiles which encompasses the entire render target area 50. There is then a set of four 4×4 rendering tile sub-regions 53, then a set of sixteen 2×2 rendering tile sub-regions 52, and finally a set comprising the 64 single rendering tile sub-regions 58. FIG. 5 also shows in bold for illustrative purposes the render target sub-regions that a primitive 80 would be considered to fall within for each set of render target sub-regions (at each layer (level) in the sets of render target sub-regions hierarchy).

FIG. 4 also shows for illustrative purposes three primitives 55, 56 and 57 which are to be rendered and which accordingly need allocating to primitive lists for rendering.

(Again, as will be appreciated by those skilled in the art, in practice any given render output, e.g., frame, to be rendered will typically comprise many more primitives than the three primitives shown in FIG. 4. However, FIG. 4 shows three primitives only for simplicity and clarity purposes.)

As discussed above, and as is known in the art, in a system where the render target 50 to be rendered is divided into smaller rendering tiles 51 for rendering purposes, it is necessary for the system to be able to identify which primitives should be rendered for each rendering tile. This is done, as is known in the art, by providing so-called primitive lists, which identify for each rendering tile the primitives that should be rendered for that rendering tile.

As discussed above, the present embodiment provides an improvement over existing primitive list preparing processes, since as well as allowing primitive lists to be prepared for render target areas (sub-regions) corresponding to the individual rendering tiles that the render target is divided into for rendering purposes, the present embodiment also prepares individual primitive lists for render target sub-regions that comprise more than one rendering tile, i.e. primitive lists that are to be used for plural rendering tiles in common.

In the present embodiment, the primitive list building unit 28 prepares a primitive list for each individual rendering tile sub-region 58, a separate primitive list for each 2×2 rendering tile sub-region 52, a separate primitive list for each 4×4 rendering tile sub-region 53, and a separate primitive list for the 8×8 rendering tile sub-region 54 that covers the entire render target 50. To do this, the primitive list building unit 28 takes each primitive in turn, determines a location for that primitive, compares the primitive's location with the locations of (the render target area covered by) the sub-regions 58, 52, 53 and 54, and then allocates the primitive to the respective primitive lists 26 for the sub-regions in the manner discussed below.

The primitive list building unit 28 determines the location of each primitive and accordingly the sub-regions that a given primitive falls within or intersects using, in this embodiment, a bounding box binning technique. Thus, as is known in the art, the primitive list building unit 28 uses the determined transformed vertex positions it is provided with for a given primitive by the programmable vertex shader 27 to construct a bounding box for the primitive and then identifies which sub-regions the primitive's bounding box falls within (intersects). This process can be carried out in any suitable and desired manner, such as by using techniques already known for this purpose in the art. The bounding box for a primitive is in an embodiment generated as part of the primitive listing process, e.g., by the primitive list building unit, but other arrangements would, of course, be possible.

As will be appreciated by those skilled in the art, other techniques for determining and locating the primitives within the render target and in relation to the sub-regions could be used if desired. For example, exact binning techniques could equally be used, as is known in the art.

In the present embodiment, the primitive list building unit 28 uses, as discussed above, a cost function assessment for different possible primitive listing (binning) solutions for a given primitive to determine which primitive lists (the primitive lists of which render target sub-regions) to list the primitive in. In essence, as will be described further below, the primitive list building unit 28 estimates the cost of listing the primitive for rendering using different possible sets of render target sub-regions (i.e. at different possible hierarchy levels), and then uses the estimated costs to determine the set of render target sub-regions (the hierarchy level) at which to list (bin) the primitive.

To do this, the primitive list building unit 28 uses a look-up table 36 of programmable costs for listing the primitives in respective sub-regions and at the level of a respective set of sub-regions, and then an array of multipliers to work out the approximate cost of listing (binning) the primitive for each respective set of sub-regions (level). Once it has done this, it then selects the set of sub-regions (level) having the lowest determined cost as the listing (binning) solution to use for the primitive, and lists the primitive in the appropriate primitive lists (for the appropriate render target sub-regions of the selected set of sub-regions) accordingly.

Figure 3:
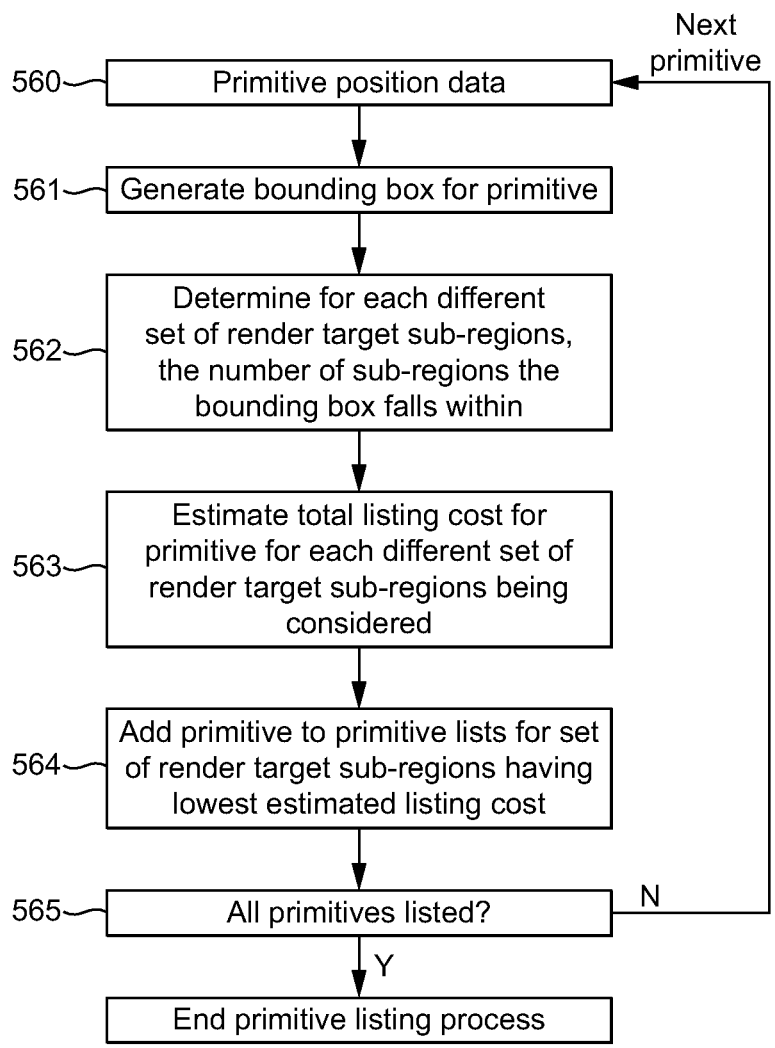
FIG. 3 shows schematically an embodiment of a process for allocating primitives to primitive lists that is in accordance with the technology described herein.

FIG. 3 illustrates this process. As shown in FIG. 3, the primitive list building unit 28 takes at its input the transformed primitive position data from the programmable vertex shader 27 for the primitive in question (step S60) and first calculates a bounding box for the primitive being considered (step S61).

In the present embodiment, the bounding box for each primitive is determined as a simple rectangle. Other arrangements would, of course, be possible.

The bounding box for a primitive can be generated in any desired and suitable manner. In the present embodiment, the input vertices for the primitive are sorted to find the extreme X, and Y values of the primitive and an initial bounding box is calculated.

Then, for each set of render target sub-regions (i.e. each hierarchy level being considered), the primitive list building unit 28 determines the (number of) sub-regions of the set of sub-regions that the primitive's bounding box falls within (step S62). (This is the number of primitive lists that the primitive will be needed to be listed in in order to render the primitive properly if listing the primitive for the set of sub-regions in question). This determination can be done using any suitable and desired technique. In the present embodiment, it is done by quantising the bounding box position to the resolution of the sub-regions at the level being considered (compared). So for 2×2 rendering tile sub-regions, for example, the X and Y positions of the sub-region (in rendering tiles) are divided by 2, so a bounding box that goes from (13, 11)→(15, 19) (tiles) would be (6, 5)→(7, 9) in 2×2 tile sub-regions. The division is performed using simple shift operations, as this is cheaper in hardware.

The primitive list building unit 28 then uses a cost function to estimate the total read and write costs associated with listing (binning), the primitive for each respective set of render target sub-regions (hierarchy level), that is being considered (step S63)). It then selects the set of sub-regions (hierarchy level) at which to list (bin) the primitive on the basis of the determined costs for the different binning solutions (in this embodiment, the binning solution that has the minimum estimated cost), and includes the primitive in the appropriate sub-region primitive lists (as determined by the primitive's bounding box) for the selected set of sub-regions (hierarchy level) (step S64).

This is repeated for each primitive of the render output (step S65).

It will be appreciated that as in the present embodiment the primitive list building unit considers the cost of binning the primitive for each set of sub-regions (hierarchy level) separately, the effect of this is that each primitive will only be listed (binned) for a single set of sub-regions (i.e. at a single level in the sets of render output sub-region's hierarchy). (For example, if a primitive's bounding box falls within six sub-regions at hierarchy level A in the sets of sub-regions hierarchy, it will either be listed, e.g. at level A, or at level A+1, but not listed for, say, four sub-regions in level A+1 and one or more other sub-regions in level A.) This helps to simplify the binning process and make it more efficient. Other arrangements would, of course, be possible.

The cost function that the primitive list building unit 28 uses has two components: the cost of writing the primitive to the primitive list(s) for the set of sub-regions in question, and the cost of reading the primitive back in from the primitive lists in the primitive list selection unit 29. The write cost for a given set of sub-region's listing (binning) solution depends on the number of primitive lists (bins) N the primitive would need to be written to for that set of sub-regions. The read-cost depends on the number of rendering tiles covered by the N bins for the set of render output sub-regions (at the hierarchy level) in question.

Thus the cost function basically determines the cost for listing the primitive for a given set of sub-regions as follows:

cost of writing a primitive=number of primitive lists (bins) written for the set of sub-regions×write cost per list (bin)

cost of reading a primitive from primitive lists=(list read cost per rendering tile+vertex read cost per rendering tile)×(number of tiles covered by each list (in each bin)×number of primitive lists (bins) written for the set of sub-regions)

so the total cost of listing a primitive for a given set of sub-regions (for a given primitive listing (binning) solution) is:

total cost=number of lists (bins) written for the set of sub-regions×(write cost per list (bin)+((list read cost per rendering tile+vertex read cost per rendering tile)×number of tiles per list (bin))).

In order to simplify the cost function determination in use, the present embodiment uses predefined values to represent the cost per primitive list (bin) for a given set of render target sub-regions (hierarchy level). Thus, the total cost of a given binning solution (i.e. for listing the primitive for a given set of render target sub-regions) is determined as follows:

total cost=number of primitive lists (bins) written× total cost per primitive list (bin) for the set of sub-regions (hierarchy level) in question.

The total cost per primitive list (bin) for a given set of sub-regions is stored in a look-up table 36 in the memory 23 for use by the primitive list building unit 28. The initial values in the look-up table are generated by analysis of a number of benchmark render outputs (e.g. images). These initial values are then modified in use, as will be discussed further below. The initially determined values are also set as default values to be used as reset values for the system, if required.

The present embodiment uses the following base cost values for a primitive list for each respective set of render target sub-regions:

| Hierarchy Level | Cost per primitive list (Bin) |
|---|---|
| 0 (1 × 1 rendering tile sub-regions) | 2.375 |
| 1 (2 × 2 rendering tile sub-regions) | 3.5 |
| 2 (4 × 4 rendering tile sub-regions) | 8 |
| 3 (8 × 8 rendering tile sub-regions) | 26 |
| 4 (16 × 16 rendering tile sub-regions) | 98 |
| 5 (32 × 32 rendering tile sub-regions) | 386 |
| 6 (64 × 64 rendering tile sub-regions) | 1538 |
| 7 (128 × 128 rendering tile sub-regions) | 6146 |
| 8 (256 × 256 rendering tile sub-regions) | 24578 |
| 9 (512 × 512 rendering tile sub-regions) | 98306 |
| 10 (1024 × 1024 rendering tile sub-regions) | 393218 |
| 11 (2048 × 2048 rendering tile sub-regions) | 1572870 |
| 12 (4096 × 4096 rendering tile sub-regions) | 6291460 |

It should be noted here that although the number of rendering tiles per primitive list (per bin) increases in the present embodiment by four for each respective set of renderer target sub-regions (hierarchy level), the cost per primitive list (bin) that is used in the cost function assessment does not simply increase by four each time. This is because it may be advantageous to cache the lists for sub-regions that encompass more than one rendering tile (as they are guaranteed to be read multiple times in the primitive selection unit 29), and therefore the read and write costs for the sets of sub-regions having larger area sub-regions may be relatively lower than for the sets of sub-regions having smaller area sub-regions.

Although the cost function cost values (factors) in the present embodiment are, as discussed above, determined based on the notion of read and write costs, the cost function cost values (factors) could be determined in many ways. For example, they could also or instead be based on the average size of a primitive in a given set of calibration primitives.

It can be seen from the above that the primitive list building unit 28 determines which set of renderer target sub-regions (which hierarchy level) each primitive should go into by using a cost function to calculate the cost of listing (binning) the primitive for each of plural different sets of render target sub-regions (hierarchy levels), and then chooses the solution with the lowest cost-function value. In this way, the primitive list building unit, in effect, finds the "cheapest" way of listing (binning) each primitive to a single set of render target sub-regions (hierarchy level), based on a model of the cost of writing primitives (primitive commands) to memory, and then reading them back during rasterising and rendering (shading).

The cost calculation process in the present embodiment can be represented schematically by the following pseudo-code:

```
For level in min_level to max_level
{
    Bbox = clip(Primitive_BBox, ScreenSize)
    bin_x_min = bbox_x_min >> level
    bin_y_min = bbox_y_min >> level
    bin_x_max = bbox_x_max >> level
    bin_y_max = bbox_y_max >> level
    x_bins = ((bin_x_max – bin_x_min)+1);
    y_bins = ((bin_y_max – bin_y_min)+1);
    number_of_bins = x_bins * y_bins;
    Tcost = number_of_bins * Tcost_per_bin[level]
}
```

Although, as described above, the present embodiment supports thirteen primitive listing hierarchy levels (sets of sub-regions), in the present embodiment each primitive is not tested against each and every one of the thirteen hierarchy levels. Instead, only some, and in an embodiment eight, but not all, of the hierarchy levels are enabled (i.e. available for use to list a primitive at) at any one time. This helps to control the memory requirements for the primitive lists. The currently enabled hierarchy levels (and that therefore a primitive should be tested against) may be selected and indicated as desired, for example as part of a job descriptor for the primitive list building unit 28.

As discussed above, in the present embodiment, the initial cost values in the look-up table 36 of programmable costs for use in the cost function are determined by statistical analysis of suitable test render output (e.g. test image) data. However, the accuracy of the cost function process is enhanced by measuring the cost of listing (binning) primitive in use and using those determined costs to update the cost function co-efficient values where appropriate.

To measure the costs being experienced in use, the present embodiment uses two different techniques.

The first such technique can be thought of as "non-invasive monitoring". In this case, the primitive list building unit 28 uses its performance counters (which are present in any event to monitor the performance of the primitive list building unit) to measure the miss rates in its pointer cache and write-buffer to determine the actual cost of writing the commands in the primitive lists that is being experienced in use. The primitive selection unit 29 also uses its performance counters to determine the miss rates and latencies associated with reading the primitives from the primitive lists. These statistics are then processed, for example either in software or hardware or a combination of both, and used to adjust the costs in the cost function look-up table that is used when calculating the primitive listing binning solution costs. For example, the graphics processor driver could be configured to take this information and use it to modify the cost values in the cost function look-up table as required.

The present embodiment is also able to carry out more "invasive" monitoring of the actual costs being experienced in use. To do this, the primitive list building unit 28 can inject dummy primitives into the primitive command stream and then collect write-cost information on just those primitives. The primitive selection unit 29 also collects read-cost information for those dummy primitives only. The dummy primitives are then removed from the stream of primitives sent for rasterising and rendering (shading).

In this arrangement, the dummy primitives can either be randomly injected invisible primitives, or the polygon list building unit 28 can inject multiple sets of sub-region hierarchy level guesses for a single real primitive. In this latter case, the costs being experienced would be gathered as before, and the primitive selection unit then determine which set of render target sub-regions (which hierarchy level) the primitive should have been listed at, whilst also passing one copy of the primitive to the rasteriser and renderer for rendering.

In these arrangements, the dummy primitives are compressed and handled in the same way as real primitives, and so can be used to send a lot of sideband information to the primitive selection unit 29, such as the write address statistics for specific dummy primitives, or even updated cost function coefficients. The primitive selection unit 29 could, for example, conditionally write the better choice of binning solution directly back to the primitive list building unit, thus closing the feedback loop in hardware.

In these arrangements, the strength of the adaptive feedback to the cost function and the cost function look-up table could range from relatively minor, low rate adjustments to individual cost function coefficients in the look-up table, to dynamically enabling or disabling entire sets of render target sub-regions (hierarchy levels). In the latter case, for example, the feedback could be used to set the cost function values for a given set of render target sub-regions (hierarchy level) to such a high value that, in effect, that set of sub-regions will never be used.

The statistics gathered from the primitive selection unit 29 could also be used, e.g., to actively tune the memory subsystem in subsystems which provide a priority arbitration and quality of service support.

The operation of the primitive testing process with respect to the primitives shown in FIG. 4 will now be described for illustrative purposes.

Taking firstly the primitive 55 shown in FIG. 4, the primitive list building unit 28 will determine how many of the single tile sub-regions 58, how many of the 2×2 tile sub-regions 52, how many of the 4×4 tile sub-regions 53, and how many of the 8×8 sub-region 54, the primitive 55 would need to be listed for if listing the primitive 55 for that set of sub-regions only. In this case, the primitive list building unit 28 will accordingly calculate that the primitive 55 will need to be listed for six single tile sub-regions 58 (as bounding box binning is being used), or for two 2×2 tile sub-regions 52, or for two 4×4 tile sub-regions 53, or once for the 8×8 tile sub-region 54.

The primitive list building unit 28 will then use the determined number of sub-regions at each set of sub-regions level to estimate the cost of listing the primitive 55 at the respective set of sub-regions level, using the cost function discussed above. In this case, the cost estimates will be as follows:

6×2.375=14.25 for the single tile sub-region 58 level;
2×3.5=7 for the 2×2 tile sub-region 52 level;
2×8=16 for the 4×4 tile sub-region 53 level; and
1×26=26 for the 8×8 tile sub-region 54 level.

The primitive list building unit 28 will accordingly select the 2×2 tile sub-region 52 level as the level at which the list primitive 55, and accordingly add the primitive 55 to the primitive lists for the respective two 2×2 tile sub-regions 52 that the primitive 55 falls within.

Similarly, for the primitive 56 shown in FIG. 4, the primitive list building unit 28 will determine how many of the single tile sub-regions 58, how many of the 2×2 tile sub-regions 52, how many of the 4×4 tile sub-regions 53, and how many of the 8×8 sub-region 54, the primitive 56 would need to be listed for if listing the primitive 55 for that set of sub-regions only. In this case, the primitive list building unit 28 will accordingly calculate that the primitive 56 will need to be listed for four single tile sub-regions 58, or for one 2×2 tile sub-region 52, or for one 4×4 tile sub-region 53, or once for the 8×8 tile sub-region 54.

The primitive list building unit 28 will then use the determined number of sub-regions at each set of sub-regions level to estimate the cost of listing the primitive 56 at the respective set of sub-regions level, using the cost function discussed above. In this case, the cost estimates will be as follows:

4×2.375=9.5 for the single tile sub-region 58 level;
1×3.5=3.5 for the 2×2 tile sub-region 52 level;
1×8=8 for the 4×4 tile sub-region 53 level; and
1×26=26 for the 8×8 tile sub-region 54 level.

The primitive list building unit 28 will accordingly again select the 2×2 tile sub-region 52 level as the level at which the list primitive 56, and accordingly add the primitive 56 to the primitive list for the respective 2×2 tile sub-region 52 that the primitive 56 falls within.

In the case of the primitive 57 shown in FIG. 4, the primitive list building unit 28 will again determine how many of the single tile sub-regions 58, how many of the 2×2 tile sub-regions 52, how many of the 4×4 tile sub-regions 53, and how many of the 8×8 sub-region 54, the primitive 57 would need to be listed for if listing the primitive 55 for that set of sub-regions only. In this case, the primitive list building unit 28 will accordingly calculate that the primitive 57 will need to be listed for four single tile sub-regions 58, or for four 2×2 tile sub-regions 52, or for one 4×4 tile sub-region 53, or once for the 8×8 tile sub-region 54.

The primitive list building unit 28 will then use the determined number of sub-regions at each set of sub-regions level to estimate the cost of listing the primitive 57 at the respective set of sub-regions level, using the cost function discussed above. In this case, the cost estimates will be as follows:

4×2.375=9.5 for the single tile sub-region 58 level;
4×3.5=14 for the 2×2 tile sub-region 52 level;
1×8=8 for the 4×4 tile sub-region 53 level; and
1×26=26 for the 8×8 tile sub-region 54 level.

The primitive list building unit 28 will accordingly select the 4×4 tile sub-region 53 level as the level at which the list primitive 57, and accordingly add the primitive 57 to the primitive list for the respective 4×4 tile sub-region 53 that the primitive 57 falls within.

The above process is repeated by the primitive list building unit 28 for each and every primitive in the render output to be rendered in turn, until complete primitive lists 26 have been generated for each sub-region of the sets of sub-regions that the render target can be divided into.

The primitive list building unit 28 places the primitives in the primitive lists 26 in the order that it receives the primitives from the programmable vertex shader 27. This means that, so far as each individual primitive list 26 is concerned, the primitives in the list are in the order that they were generated, which will, as is known in the art, typically correspond to the desired order of rendering the primitives. (As is known in the art, when primitives are generated for rendering, they are usually generated by the host driver or API in the order that it is desired to render the primitives and are provided to the graphics processor in that order. Thus, as the primitive list building unit 28 takes the primitives in turn as they are received, it will place the primitives in the individual tile lists in rendering order so far as each individual primitive list is concerned.)

The primitive list building unit 28, at the same time as it places a primitive in the appropriate primitive list or lists, also allocates to and associates with the primitive in the primitive list 26 an index for the primitive. The primitive list building unit 28 has a counter for this purpose, and simply allocates to the primitives as they are rendered the current count of the counter. The present embodiment can be configured to increment the index for each new primitive, or to only change (increment) the index allocated to a primitive when a primitive is being listed in a new set of sub-regions (i.e. when the hierarchy level at which the primitives are being listed changes (i.e. differs to the set of sub-regions (the hierarchy level) for the preceding primitive)).

In this way, each primitive is numbered (in ascending order in this embodiment) in the order in which it was received by the primitive list building unit 28 (i.e. in the order in which the primitives are provided by the host driver or API, etc., i.e. the order in which it is desired for the primitives to be rendered). The indices allocated by the primitive list building unit 28 to each primitive are used by the primitive selection unit 29, as will be discussed further below, to identify and select the next primitive for rendering from the primitive lists 26 in the memory 23.

This indexing of the primitives as they are placed in the primitive lists 26 is desirable, because, as is known in the art, and as discussed above, it is usually desired in graphics processing systems to render the primitives in a particular order. This is not a problem where there is only a single primitive list from which to take primitives for rendering, since in that case, as discussed above, the primitives will be included in the primitive list in the order that they are provided to the graphics processor, i.e. in the desired order for rendering. However, where, as in the present embodiment, the next primitive for rendering may need to be selected from more than one primitive list, selecting the primitives in the correct order for rendering may not be so straightforward. Indexing the primitives in the manner discussed above helps to alleviate this difficulty, since it allows, as will be discussed further below, the primitive selection unit 29 to identify the order that the primitives were provided to the graphics processor for rendering, and accordingly, to select the next primitive in that order.

Once the primitive list building unit 28 has finished building the primitive lists 26 for the render output (e.g. frame) to be rendered, and stored those lists in the memory 23, the renderer 22 can then render the output (e.g. frame). This process will now be described.

As discussed above, in the present embodiment, the rendering process is performed on a rendering tile by rendering tile basis, i.e. each rendering tile 51 of the render output is rendered individually in turn, and the rendered tiles are combined to provide the overall render output (e.g. frame for display).

Thus, the renderer 22 is first provided with the identity of the rendering tile to be rendered and uses this to configure itself appropriately. In particular, the stored primitive lists 26 that apply to the rendering tile that is to be rendered, i.e., in the present embodiment, the primitive list that is exclusive to the individual rendering tile that is to be rendered, the primitive list for the 2×2 rendering tile sub-region that includes the rendering tile that is to be rendered, the primitive list for the 4×4 rendering tile sub-region that includes the rendering tile that is to be rendered, and the primitive list for the 8×8 rendering tile sub-region that covers the entire render target (and therefore that must cover the individual rendering tile that is currently to be rendered), are identified. In the present embodiment, the stored primitive lists that apply to the tile being rendered are indicated by including pointers to the relevant primitive lists in the "new tile" command that is sent when a tile is first to be rendered. (Other arrangements would, of course, be possible.)

The renderer then proceeds to render the tile in question.

The first stage in the rendering process is for the primitive selection unit 29 to select a primitive to be rendered. To do this, the primitive selection unit 29 reads the stored primitive lists 26 that have been determined as applying to the tile that is currently being rendered, i.e., in the present embodiment, as discussed above, the primitive list 26 that is exclusive to the individual rendering tile that is being rendered, the primitive list for the 2×2 rendering tile sub-region that includes the tile that is being rendered, the primitive list for the 4×4 rendering tile sub-region that includes the tile that is being rendered, and the primitive list for the 8×8 rendering tile sub-region that covers the entire render target. The primitive lists are read in a first-in, first-out order by the primitive selection unit 29, i.e. such that, in effect, the first primitive in a list is read, and then, once that primitive has been sent for rendering, the second primitive in the list is read, and so on.

To select the next primitive to be rendered, the primitive selection unit 29 determines the indexes that have been allocated to the next primitive to be rendered in each primitive list for the tile being rendered, compares those indices, and selects the lowest index primitive as the next primitive to be rendered (since, as discussed above, the primitives are indexed by the primitive list building unit 28 in ascending order, i.e. such that the lowest numbered primitive is the next primitive to be rendered for the desired rendering order).

Thus the primitive selection unit 29 will read in the index of the next primitive in the primitive list for the single rendering tile sub-region in question, the index of the next primitive in the primitive list for the relevant 2×2 rendering tile sub-region, the index of the next primitive in the primitive list for the appropriate 4×4 rendering tile sub-region, and so on, compare those indices, and select the primitive with the lowest index for rendering next. (The primitive selection unit 29 only needs to read the index of one primitive (the next primitive) from each primitive list at any one time, since, as discussed above, within the individual primitive lists, the primitives are already listed in the correct rendering order.) In effect, the primitives can be thought of as being streamed one-by-one to the primitive selection unit in order from the stored primitive lists, on a first-in, first-out basis.

Once the primitive selection unit 29 has selected the primitive to be rendered, it passes that primitive to the vertex selection unit 31. The vertex selection unit 31 then retrieves the appropriate transformed geometry data for the vertices of the primitive in question from the transformed geometry data 25 stored in the memory 23, and provides that data to the rasterising unit 33. The primitive is then rasterised and rendered, and the resulting rendered primitive data stored appropriately in the tile buffers 35 as discussed above, and as is known in the art.

The process is then repeated, i.e. the primitive selection unit 29 again reads the index of the next primitive of each relevant primitive list, selects the primitive with the lowest index, and provides that primitive to the vertex selection unit 31, and so on.

This process is repeated for all the primitives that need to be rendered for a given rendering tile (i.e. that are included in primitive lists 26 appropriate to the tile) until all the primitives for the tile have been rendered (and so the tile buffers contain all the rendered data for the tile in question). The rendered tile data can then be written out (exported) to external memory, such as a frame buffer in main memory (not shown), as is known in the art.

The renderer 22 then renders the next rendering tile in the same manner, and so on, until all the individual rendering tiles for the render output have been rendered (and written out to external memory, such as a frame buffer).

Once all the tiles for the render output have been rendered, the combined set of rendered tiles may then be provided as the render output, e.g., to a display device for display, as is known in the art. The process is then repeated for the next render output (e.g. frame) to be generated, and so on.

As discussed above, the renderer 22 also includes a primitive list cache 30 and a vertex data cache 32.

Although these caches are shown separately for illustration purposes in FIG. 2, in practice the primitive lists and vertex data may be cached in the general purpose L2 cache of the graphics processor.

The primitive selection unit 29 is configured to store in the primitive list cache 30 one or more primitive lists 26 that it has read from the main memory 23. In particular, the primitive selection unit 29 preferentially retrieves from the memory 23 and stores in the primitive list cache 30 primitive lists that apply to sub-regions that comprise more than one rendering tile that, for example, the primitive selection unit 29 knows it will require for subsequent rendering tiles. This helps to avoid delays and latency due to the primitive selection unit 29 having to retrieve repeatedly from the memory 23 primitive lists that it will require for plural rendering tiles.

The vertex selection unit 31 can similarly cache vertex data that it retrieves from the transformed geometry data 25 in the memory 23 in the vertex data cache 32, again in particular where it can be identified that the vertex data will be required for a primitive again (for example because it is known that the primitive is listed for a render output sub-region that encompasses plural rendering tiles).

In the present embodiment, the storing of and in particular the replacement of, the data cached in the primitive list cache 30 and vertex data cache 32 is based on the level in the sets of sub-region's hierarchy to which the primitive list and/or vertex data applies or has been stored in respect of, such that, for example, primitive lists and vertex data that apply to higher levels in the hierarchy (i.e. that will therefore be used for more rendering tiles in the output to be rendered) are preferentially cached and retained in the caches as compared to primitive lists and vertex data that it is known apply, for example, to a single rendering tile or only a few rendering tiles.

Thus, for example, when the vertex selection unit 31 reads transformed vertices from the transformed geometry data 25 in the memory 23, it will know at what level the primitive that that vertex data applies to has been listed (i.e. the primitive list that the primitive has come from), and can use that information to, for example, decide whether or not to cache the vertex data (e.g., based, as discussed above, on whether or not it is likely that that vertex data will be re-used for subsequent rendering tiles).

The order that the rendering tiles of the render output are processed by the renderer 22 can be selected as desired. However, in an embodiment, the tiles are processed in Morton or a similar order, as this facilitates, for example, the more efficient caching of primitive lists and vertex data in the renderer 22.

Although the present embodiment has been described above with particular reference to the preparation of primitive lists for sub-regions of the render target, it would also be possible to store other data that may be used on a sub-region basis in a similar manner. In an embodiment, this is done. Such data could comprise, for example, rendering settings, tiling commands, scissoring parameters, etc. It would be advantageous if, for example, such a command is to be used for every rendering tile, to place the command in a list that applies to all the rendering tiles together, or, alternatively, if a command only applies to a few rendering tiles, to store the command at a lower level in the hierarchy. In an embodiment, this data is also stored in or associated with the respective primitive lists that are prepared for each render target sub-region, as appropriate, and in an embodiment is indexed in a similar manner to that discussed above for the primitives.

Similarly, although the present embodiment has been described above with reference to the situation where the render target is square, the present embodiment can equally be applied to non-square, rectangular render targets, for example. In this case, the sub-regions still relate to square sets of rendering tiles, but are allowed to cover non-existent rendering tiles (i.e. to, in effect, extend beyond the edges of the render target).

Figure 7:
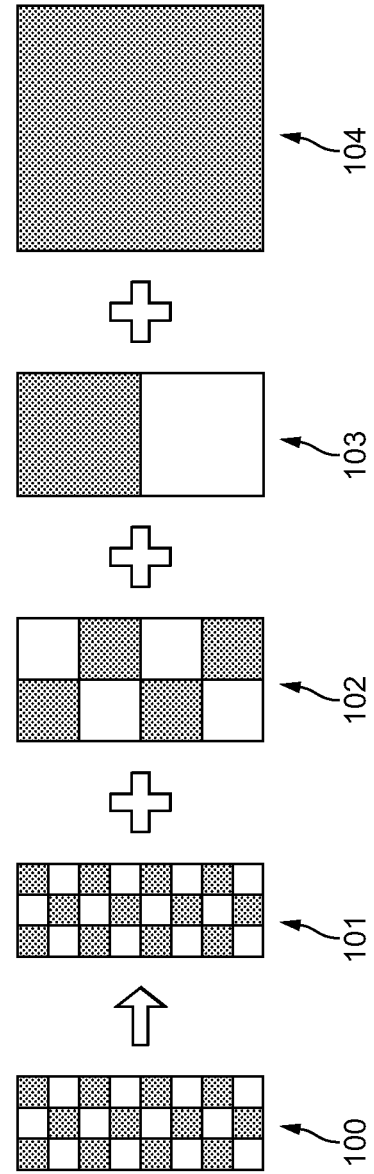
FIG. 7 shows schematically an arrangement of sets of render target sub-regions for a non-square render target.

FIG. 7 illustrates this, and shows a render target 100 that is 3×8 rendering tiles in dimension, and which is overlaid by four sets of render target sub-regions: a first set 101 comprising 3×8 sub-regions each corresponding to a single rendering tile, a second set 102 of sub-regions comprising 2×4 sub-regions that are each 2×2 rendering tiles in size, a third set 103 of sub-regions comprising two sub-regions that are each 4×4 rendering tiles in size, and finally a "top" level set 104 of sub-regions comprising a single sub-region that is 8×8 rendering tiles in size. It can be seen that the larger area sets of sub-regions that are used extend beyond the edges of the render target 100 (and so encompass non-existent rendering tiles).

It would also be possible, e.g., to modify the costs associated with listing (binning) primitives to take account of variations in the writing and/or reading (or other costs) that it is known will be encountered over time. For example, where the primitive listing process uses an encoding scheme whose writing and/or reading costs can vary when listing the primitives in the primitive lists, such as a delta (difference)-based compression scheme where listing the initial primitives for a given list (bin) will be more costly (will need more bytes to encode) than writing later primitives to that list (bin) (as the delta-compression scheme will mean that less bytes will be needed to write later primitives in the list), then the costs associated with listing primitives for a given (and in an embodiment for each) set of sub-regions could be set to be higher when the primitive list is to be initially created (to take account of the temporary increase to the write-costs when the list (bin) is first written to), but then reduced once the list has been created and contains primitives. Thus, the, e.g., write cost for a primitive at a given hierarchy level could be decreased once the list (bin) for the set of sub-regions in question has been created and stored (e.g. contains (at least) one primitive).

Similarly the, e.g. write, cost for a given set of sub-regions may be temporarily increased when re-writing a primitive list that isn't already "open" (cached for the primitive list building unit) when using a delta-based compression scheme, to take account of the fact that the cost of re-writing a list that isn't cached (already in use) may be higher than writing to a list that has already been cached (e.g. because if the primitive list isn't cached, it may be necessary to re-read the previous data item in order to calculate the new delta (difference) to be used, or the system may in this event revert to writing uncompressed data to start with).

As will be appreciated by those skilled in the art, the present embodiment (and the technology described herein) can be implemented in any tile-based rendering system, as desired. The various components and functions of the present embodiment and the technology described herein can similarly be implemented as desired and using any suitable techniques known in the art.

It can be seen from the above that the technology described herein, in its embodiments at least, provides an improved primitive listing and sorting arrangement for tile-based rendering systems that in particular facilitates more efficient use of memory bandwidth, and can reduce latencies, etc., for the primitive listing (binning) process.

This is achieved, in the embodiments of the technology described herein described herein at least, by considering the relative costs of different possible primitive listing arrangements, and then selecting the primitive listing arrangement to use based on the cost assessment.

Embodiments use an adaptive cost function that can be modified in use based on analysis of the costs for the primitive listing process actually being experienced in use. This then allows the system to, for example, re-optimise in real-time as the content to be rendered and the memory subsystem load changes.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

What is claimed is:

1. A method of sorting graphics primitives for rendering into lists representing different areas of a render target to be generated in a tile-based graphics processing system, the method comprising:
dividing by processing circuitry a render target into plural rendering tiles for rendering purposes;
preparing by processing circuitry primitive lists indicating primitives to be processed for at least two different sets of sub-regions of the render target area, at least one of the two different sets of sub-regions of the render target area comprising sub-regions of the render target area that are bigger than a single rendering tile;
the method further comprising:
for a primitive to be rendered:
determining by processing circuitry sub-regions of at least two of the at least two different sets of sub-regions of the render target area that the primitive could need to be listed for in order to render the primitive;
using a cost function by the processing circuitry to determine plural cost values representing the cost of listing the primitive in the primitive lists for the render target area sub-regions that it has been determined that the primitive could need to be listed for; and
selecting by the processing circuitry which of the render target area sub-regions that it has been determined that the primitive could need to be listed for in order to render the primitive to list the primitive for based on the determined plural cost values, and including the primitive in the primitive lists of those selected sub-regions by the processing circuitry.

2. The method of claim 1, comprising:
for a primitive to be rendered;
determining by the processing circuitry two or more alternative primitive listing solutions for rendering the primitive;
determining by the processing circuitry using the cost function a total cost value for each one of the determined alternative primitive listing solutions representing the cost of listing the primitive for rendering using that alternative primitive listing solution;
selecting by the processing circuitry one of the determined alternative primitive listing solutions based on the determined total cost values; and
including by the processing circuitry the primitive in the primitive lists of the render target area sub-regions that it has been determined that the primitive would need to be listed for the selected primitive listing solution.

3. The method of claim 2, wherein the primitive listing solutions that are considered each correspond to listing the primitive for a respective different set of render target sub-regions.

4. The method of claim 2, wherein the cost function uses stored predefined cost values that are then multiplied by the processing circuitry by the number of primitive lists that the primitive would be listed in for the primitive listing solution in question to determine the cost for each primitive listing solution being considered.

5. The method of claim 1, wherein the sets of render target sub-regions for which primitive lists can be prepared are arranged such that the render target is overlaid by plural layers of sets of sub-regions, with each layer being one set of sub-regions and having different sized sub-regions for which primitive lists can be prepared to the other layers.

6. The method of claim 1, wherein the cost function uses a predefined overall cost for each different render target sub-region size and then sums these costs for each primitive list being considered.

7. The method of claim 6, wherein the predefined overall cost for each different render target sub-region size can be modified in use.

8. The method of claim 1, comprising adapting by the processing circuitry the operation of the cost function in use, based on the cost of reading and/or writing the primitives from and to the primitive lists being encountered as the primitive lists are prepared and used.

9. The method of claim 8, comprising adapting by the processing circuitry the cost function operation by updating cost values used in the cost function.

10. The method of claim 8, comprising adapting by the processing circuitry the cost function operation by enabling or disabling listing of primitives for one or more of the sets of render target sub-regions.

11. An apparatus for sorting graphics primitives for rendering into lists representing different areas of a render target to be generated in a tile-based graphics processing system, the apparatus comprising:
- a graphics processor comprising processing circuitry configured to:
- divide a render target into plural rendering tiles for rendering purposes; and
- prepare primitive lists indicating primitives to be processed for at least two different sets of sub-regions of the render target area, at least one of the two different sets of sub-regions of the render target area comprising sub-regions of the render target area that are bigger than a single rendering tile;
- the graphics processor further comprising processing circuitry configured to:
- determine for a primitive to be rendered, sub-regions of at least two of the at least two different sets of sub-regions of the render target area that the primitive could need to be listed for in order to render the primitive;
- use a cost function to determine plural cost values representing the cost of listing the primitive in the primitive lists for the render target area sub-regions that it has been determined that the primitive could need to be listed for; and
- select which of the render target area sub-regions that it has been determined that the primitive could need to be listed for in order to render the primitive to list the primitive for based on the determined plural cost values, and include the primitive in the primitive lists of those sub-regions;

and
a memory that stores the primitive lists.

12. The apparatus of claim 11, wherein the processing circuitry of the graphics processor is configured to:
for a primitive to be rendered;
- determine two or more alternative primitive listing solutions for rendering the primitive;
- determine using the cost function a total cost value for each one of the determined alternative primitive listing solutions representing the cost of listing the primitive for rendering using that alternative primitive listing solution;
- select one of the determined alternative primitive listing solutions based on the determined total cost values; and
- include the primitive in the primitive lists of the render target area sub-regions that it has been determined that the primitive would need to be listed for the selected primitive listing solution.

13. The apparatus of claim 12, wherein the primitive listing solutions that are considered each correspond to listing the primitive for a respective different set of render target sub-regions.

14. The apparatus of claim 12, wherein the cost function uses stored predefined cost values that are then multiplied by the number of primitive lists that the primitive would be listed in for the primitive listing solution in question to determine the cost for each primitive listing solution being considered.

15. The apparatus of claim 11, wherein the sets of render target sub-regions for which primitive lists can be prepared are arranged such that the render target is overlaid by plural layers of sets of sub-regions, with each layer being one set of sub-regions and having different sized sub-regions for which primitive lists can be prepared to the other layers.

16. The apparatus of claim 11, wherein the cost function uses a predefined overall cost for each different render target sub-region size and then sums these costs for each primitive list being considered.

17. The apparatus of claim 16, wherein the predefined overall cost for each different render target sub-region size can be modified in use.

18. The apparatus of claim 11, comprising processing circuitry configured to adapt the operation of the cost function in use, based on the cost of reading and/or writing the primitives from and to the primitive lists being encountered as the primitive lists are prepared and used.

19. The apparatus of claim 18, comprising adapting the cost function operation by updating cost values used in the cost function.

20. The apparatus of claim 18, comprising adapting the cost function operation by enabling or disabling listing of primitives for one or more of the sets of render target sub-regions.

21. A graphics processor for use in a tile-based graphics processing system, the graphics processor comprising processing circuitry configured to:
- divide a render target into plural rendering tiles for rendering purposes; and
- prepare primitive lists indicating primitives to be processed for at least two different sets of sub-regions of the render target area, at least one of the two different sets of sub-regions of the render target area comprising sub-regions of the render target area that are bigger than a single rendering tile;
- the graphics processor further comprising processing circuitry configured to:
- sort graphics primitives for rendering into lists representing different areas of a render target to be generated;
- determine for a primitive to be rendered, sub-regions of at least two of at least two different sets of sub-regions of the render target area that the primitive could need to be listed for in order to render the primitive;
- use a cost function to determine plural cost values representing the cost of listing the primitive in the primitive lists for the render target area sub-regions that it has been determined that the primitive could need to be listed for; and
- select which of the render target area sub-regions that it has been determined that the primitive could need to be listed for in order to render the primitive to list the primitive for based on the determined plural cost values, and include the primitive in the primitive lists of those sub-regions.

22. A non-transitory computer readable storage medium storing computer software code which when executing on a processor performs a method of sorting graphics primitives for rendering into lists representing different areas of a render target to be generated in a tile-based graphics processing system, the method comprising:
- dividing by processing circuitry a render target into plural rendering tiles for rendering purposes; and
- preparing by processing circuitry primitive lists indicating primitives to be processed for at least two different sets of sub-regions of the render target area, at least one of the two different sets of sub-regions of the render target area comprising sub-regions of the render target area that are bigger than a single rendering tile;
- the method further comprising:
- for a primitive to be rendered:
- determining by processing circuitry sub-regions of at least two of the at least two different sets of sub-regions of the render target area that the primitive could need to be listed for in order to render the primitive;

using a cost function by the processing circuitry to determine plural cost values representing the cost of listing the primitive in the primitive lists for the render target area sub-regions that it has been determined that the primitive could need to be listed for; and selecting by the processing circuitry which of the render target area sub-regions that it has been determined that the primitive could need to be listed for in order to render the primitive to list the primitive for based on the determined plural cost values, and including the primitive in the primitive lists of those selected sub-regions by the processing circuitry.

* * * * *